United States Patent
Ehlbeck et al.

[11] Patent Number: 6,092,021
[45] Date of Patent: Jul. 18, 2000

[54] FUEL USE EFFICIENCY SYSTEM FOR A VEHICLE FOR ASSISTING THE DRIVER TO IMPROVE FUEL ECONOMY

[75] Inventors: James M. Ehlbeck, LaCenter, Wash.; Goetz Renner, Esslingen, Germany; Jared A. Powell; Christopher L. Kirn, both of Portland, Oreg.

[73] Assignee: Freightliner Corporation, Portland, Oreg.

[21] Appl. No.: 08/982,117

[22] Filed: Dec. 1, 1997

[51] Int. Cl.⁷ .............................. G06G 7/70; G01L 3/26
[52] U.S. Cl. .............................. 701/123; 701/29; 73/113; 73/114; 73/117.3; 73/115
[58] Field of Search .............................. 701/30, 29, 123, 701/32; 73/113, 114, 112, 116, 115, 117.3, 119 A; 340/439, 325.06, 462, 870.16, 436, 870.13, 461; 123/478, 480; 477/100, 42, 43, 107

[56] References Cited

U.S. PATENT DOCUMENTS

| | | | |
|---|---|---|---|
| 3,695,245 | 10/1972 | Ishida | 123/444 |
| 3,925,753 | 12/1975 | Auman et al. | 340/439 |
| 4,157,030 | 6/1979 | Keely | 73/113 |
| 4,247,757 | 1/1981 | Crump, Jr. | 73/114 |
| 4,258,421 | 3/1981 | Juhasz et al. | 701/35 |
| 4,384,479 | 5/1983 | Handtmann | 73/114 |
| 4,400,779 | 8/1983 | Kosuge et al. | 701/123 |
| 4,475,380 | 10/1984 | Colovas et al. | 73/114 |
| 4,494,404 | 1/1985 | Striffer | 73/113 |
| 4,502,124 | 2/1985 | Grohmann et al. | 701/123 |
| 4,533,962 | 8/1985 | Decker et al. | 360/5 |
| 4,564,905 | 1/1986 | Masuda et al. | 73/114 |
| 4,570,226 | 2/1986 | Aussedat | 701/123 |
| 4,630,027 | 12/1986 | Muhlberger et al. | 701/30 |
| 4,663,718 | 5/1987 | Augello et al. | 73/114 |
| 4,706,083 | 11/1987 | Baatz et al. | 73/113 |
| 4,747,301 | 5/1988 | Bellanger | 73/117.3 |
| 4,845,630 | 7/1989 | Stephens | 701/123 |
| 4,945,759 | 8/1990 | Krofchalk et al. | 73/117.3 |
| 5,017,916 | 5/1991 | Londt et al. | 340/870.13 |
| 5,074,144 | 12/1991 | Krofchalk et al. | 73/117.3 |
| 5,148,702 | 9/1992 | Gulick, Jr. | 73/114 |
| 5,173,856 | 12/1992 | Purnell et al. | 701/35 |
| 5,303,163 | 4/1994 | Ebaugh et al. | 340/439 |
| 5,652,378 | 7/1997 | Dussault | 73/114 |
| 5,693,876 | 12/1997 | Ghitea, Jr. | 73/114 |

OTHER PUBLICATIONS

Cadec, *Celect RoadRelay*™, User's Guide, Cadec Systems, Inc., Londonderry, NH, Cummins Electric, 1993.
Flyer, *Detroit Diesel*, ProDriver™, User Manual, 1994.
*Operating and Error Codes*, Series 925/205, FloScan Instrument Company, Inc., Seattle, WA, 4/93.
Caterpillar©, Owner's Manual, Caterpillar Driver Information Display, Feb., 1995.
*Joint SAE/TMC Electronic Data Interchange Between Microcomputer Systems in Heavy–Duty Vehicle Applications*, 1988.

Primary Examiner—Jacques H. Louis-Jacques
Attorney, Agent, or Firm—Klarquist Sparkman Campbell Leigh & Whinston, LLP

[57] ABSTRACT

A fuel efficiency monitoring and display system for a vehicle dynamically evaluates vehicle performance parameters to detect conditions that cause excessive fuel consumption. The conditions include increased aerodynamic drag due to excessive speed, high RPM, braking and accelerating, excessive idling, and rapid throttle movements. The system dynamically estimates gross vehicle weight, roadway grade and drag factor from monitored parameters and uses these estimates to detect inefficient fuel use. The system indicates to the driver when inefficient fuel use is detected. For example, it displays a measure of excess fuel consumed and messages indicating actions that can be taken to improve fuel economy in response to detecting inefficient fuel use.

54 Claims, 13 Drawing Sheets

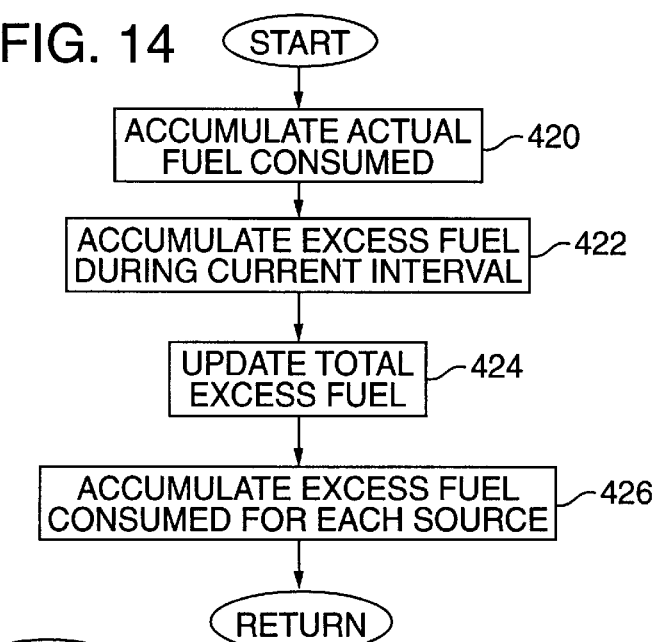
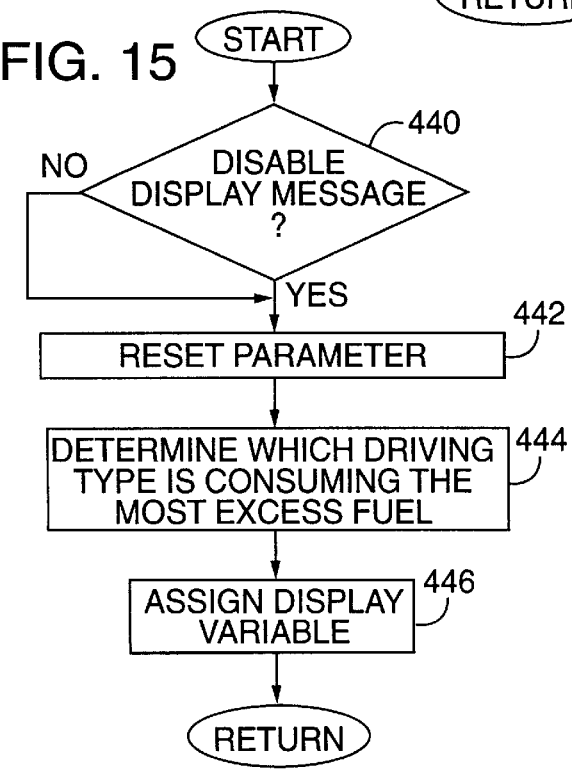
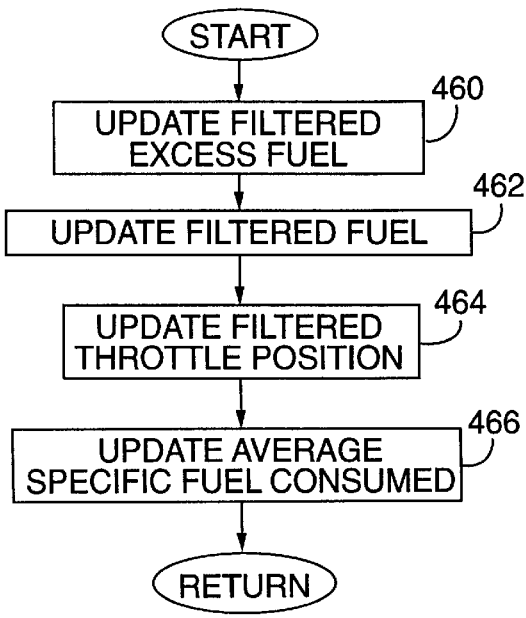

FUEL USE EFFICIENCY SYSTEM FOR A VEHICLE FOR ASSISTING THE DRIVER TO IMPROVE FUEL ECONOMY

TECHNICAL FIELD

The invention relates to a fuel efficiency indicator in a vehicle, and more specifically relates to a system for dynamically detecting inefficient driving actions and indicating information about excess fuel consumption to the driver.

BACKGROUND OF THE INVENTION

With rising fuel costs, an important design goal of vehicle information systems is to provide drivers, and especially drivers of long-haul trucks, with information about fuel economy during operation of the vehicle. Many vehicles display a measure of fuel economy such as the gas mileage in miles per gallon. While this information is helpful, it does not give the driver specific feedback on how specific driving actions impact fuel economy. In addition, it fails to provide a measure of excess fuel consumption due to specific types of driving actions. Drivers are less likely to get information that can help them improve fuel economy from these fuel economy measures, and thus, are more likely to ignore them.

Modern motor vehicles are typically equipped with a variety of onboard computers for measuring and recording vehicle performance and diagnostic data. These devices provide a great deal of information about the performance of the vehicle during operation. The problem is not lack of information, but rather, evaluating it and conveying it to the driver in a useful fashion. There is a need for a fuel efficiency indicator that uses this data to assist the driver to operate the vehicle more efficiently and take actions that avoid excess fuel consumption.

SUMMARY OF THE INVENTION

The invention provides a fuel efficiency system and related method that indicate when the driver is operating the vehicle inefficiently. This system provides feedback to the driver when the vehicle is consuming excess fuel due to inefficient driving actions. It monitors vehicle performance data and dynamically analyzes the data to determine when the driver's actions result in inefficient fuel use. When the system detects a condition that cause the vehicle to consume excess fuel, it indicates the presence of the condition to the driver.

In one embodiment of the invention, the fuel efficiency system displays a message indicating that fuel inefficient driving has been detected. In addition, the system also provides the cause of excess fuel use and suggests an action that the driver can take to fuel economy. This embodiment also computes the amount of excess fuel consumed due to inefficient driving and displays a measure of it to the driver.

In this embodiment, the system monitors several inefficient driving conditions, including excessive speed leading to increased aerodynamic drag, high engine RPM, excessive idling, frequent braking and accelerating, and rapid throttle movement. During operation of the vehicle, the system dynamically determines whether these inefficient driving conditions are present. In evaluating the vehicle performance data, the system evaluates performance parameters to distinguish between inefficient and normal driving actions. When inefficient driving is detected, the system computes a measure of excess fuel consumed due to the inefficient driving action.

This embodiment includes an output device, namely a display device, to indicate a measure of the excess fuel consumed due to a detected condition that has caused the vehicle to consume excess fuel. It also uses the output device to provide the driver with prompting messages indicating the cause of the excess fuel consumption and a driver action that can be taken to reduce excess fuel consumption. For example, in response to detecting excess fuel consumption due to braking and accelerating, the display prompts the driver with a text message stating, "Drive Steady Speed." Other types of output devices can be used to convey this information to the driver such as an audio speaker to provide the information aurally.

Further advantages and features of the invention will become apparent with reference to the following detailed description and accompanying drawings.

BRIEF DESCRIPTION OF THE DRAWINGS

FIG. 14 is a flow diagram of a total sub-module in the excess module for accumulating fuel consumption values.

FIG. 15 is a flow diagram of a display sub-module in the excess module for determining whether to display a message regarding inefficient fuel use for an inefficient driving action evaluated in the excess module.

FIG. 16 is a flow diagram of an average sub-module in the excess module for filtering selected variables.

DETAILED DESCRIPTION

One embodiment of the invention is a fuel efficiency monitoring and display system implemented using electronic control units onboard a truck. In particular, this embodiment includes an instrumentation control unit for detecting and displaying information about inefficient driving conditions, and one or more control units or discrete sensors for monitoring vehicle performance data. The next section describes the system architecture of the electronic control units onboard a vehicle in this embodiment. Later sections describe an implementation of the fuel efficiency system and related methods in more detail.

The System Architecture

Figure 1:
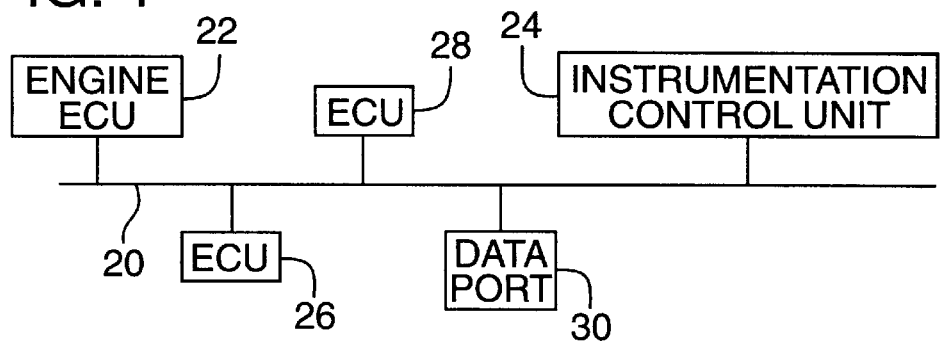
FIG. 1 is a block diagram illustrating the system architecture in a truck for one embodiment of the invention.

FIG. 1 is a block diagram illustrating the system architecture of electronic control units in a truck used to monitor vehicle performance data in an embodiment of the invention. The system architecture includes a number of electronic control units (ECU) interconnected via a data link 20. In particular, the system shown in FIG. 1 includes an engine ECU 22, located at the engine, and an instrumentation control unit 24, located at the dash of the truck. As shown, other optional ECUs 26, 28 can be connected to the data link 20. Finally, the system includes an optional data port 30, for coupling external data processing equipment to the ECUs on board the truck. This data port enables an external computer, for example, to receive and transmit messages on the data link. It also enables an external computer to download data or a file to an ECU and to receive data or a file from an ECU.

The Engine Control Unit

Figure 2:
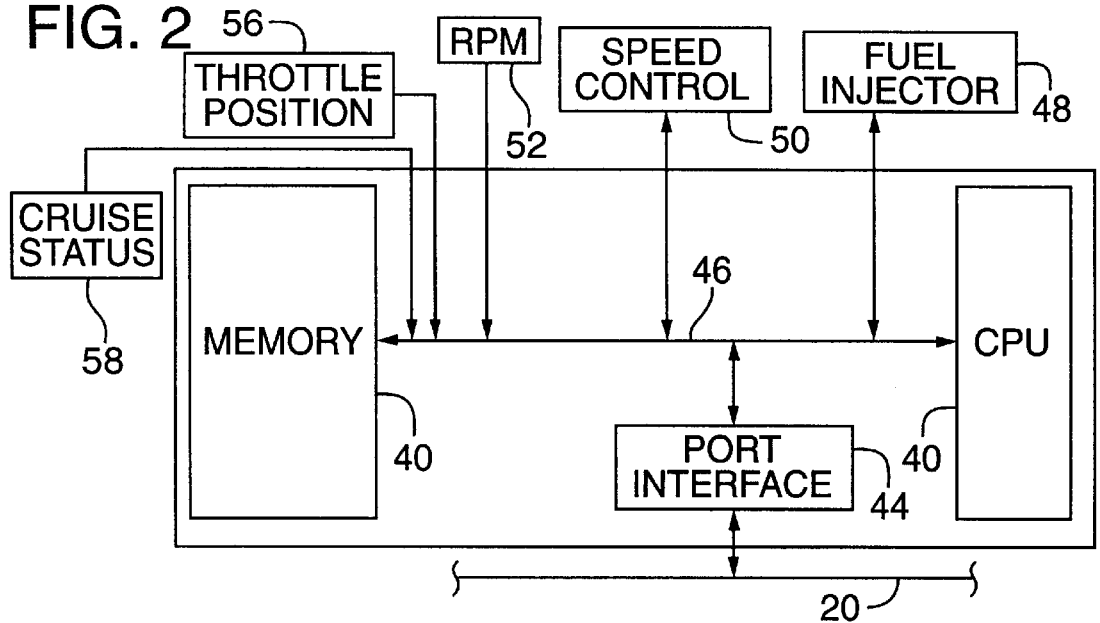
FIG. 2 is a block diagram illustrating the engine electronic control unit (ECU) in more detail.

FIG. 2 is a block diagram illustrating the engine ECU used to collect vehicle performance data in the system shown in FIG. 1. The engine ECU includes memory 40, a CPU 42, and a port interface 44 connected via a bus structure 46. The CPU 42 executes routines stored in the memory 40 to control and monitor engine performance. The port interface 44 serves as a link between the CPU 42 and a serial communication path called the data link 20.

The engine ECU also includes a variety of sensors and controls used to monitor and control the engine. In this implementation, the engine ECU controls the fuel rate by issuing control signals to a fuel injector 48 that controls the flow of fuel to the engine's cylinders. This implementation of the ECU includes several sensors that monitor vehicle performance, including a speed sensor 50, an RPM sensor 52, a throttle position sensor 56 and a cruise status sensor 58. Some vehicle performance parameters are computed from measured data. For example, the engine torque is computed as a function of measured parameters, including fuel rate and turbo boost pressure.

The engine ECU controls the fuel rate and serves as a fuel rate measuring device for the system. It compares the throttle position to the percent engine load. If their is a difference, then the engine ECU changes the dwell time of the fuel injector (increases or decreases the fuel injected into the cylinder). Before the engine ECU applies the dwell to the fuel injector, it processes the dwell time further to limit emissions. The emission control computation can modify the injection timing and dwell.

In this implementation, the engine ECU determines the amount of fuel supplied to the cylinders in the engine by controlling the solenoid valves that inject fuel to the engine cylinders. The rate of fuel flow is directly related to the amount of time that the solenoid valve is closed. This time period determines the volume of fuel injected into a cylinder per revolution. By determining the amount of time that the solenoid valves are closed, the engine ECU computes the amount of fuel consumed by the engine. The engine ECU calculates the fuel flow rate from the dwell of the injection pulse and the engine speed.

The engine ECU in this embodiment is also responsible for measuring and computing the vehicle's road speed. The speed control 50 senses the speed of rotation of the tail shaft of the transmission and converts it into road speed. A magnetic sensor located on the tail shaft generates an analog signal comprised of a series of pulses representing the rotation rate of the tail shaft or drive shaft. This analog signal is converted into a digital signal. The engine ECU is programmed to read this digital signal and derive the instantaneous vehicle speed in miles per hour.

The engine ECU is responsible for monitoring a variety of other vehicle performance parameters, including RPM, and throttle position. It derives engine torque from the fuel rate, and turbo boost pressure. These parameters are transferred to the instrumentation control unit over the data link.

The Instrumentation Control Unit

Figure 3:
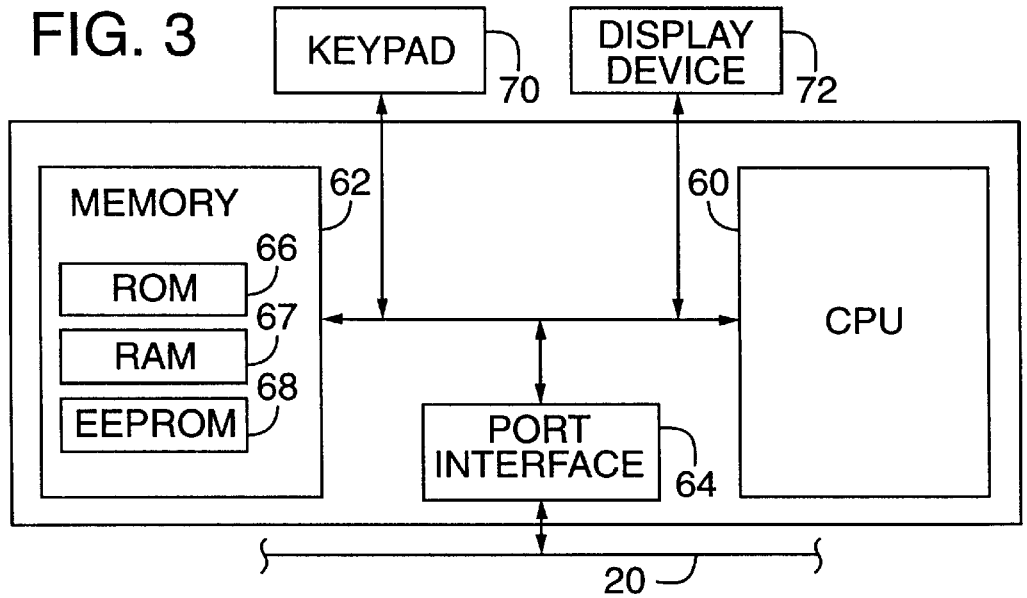
FIG. 3 is a functional block diagram illustrating the architecture of the instrumentation control unit (ICU).

FIG. 3 is a functional block diagram illustrating the architecture of an instrumentation control unit (ICU) used to detect inefficient fuel/use and control a driver display in one implementation of the invention. The instrumentation control unit comprises a CPU 60, memory 62 and a port interface 64 for connecting the unit to the data link 20. The memory 62 includes programmable ROM (EEPROM) 66, RAM 67 and permanent ROM 68. The routines for controlling the ICU are stored in ROM 68, while re-configurable data is stored in the EEPROM 68.

In one specific implementation, the ICU includes a 68HC11 microprocessor from Motorola Corporation, and its memory 62 comprises EEPROM, ROM, and RAM. This specific ICU has 8 KB of external EEPROM, 128K of ROM and 2K of RAM. The internal memory of the CPU comprises 256 Bytes of RAM and 512 bytes of EEPROM. This is only one specific implementation of the ICU. A variety of conventional processors and memory systems can be used to implement the functionality of the instrumentation control unit.

Preferably, the processor used in the ICU should be a 16 bit processor. The processor used in the current implementation was selected to have sufficient speed and memory to be able to evaluate five different fuel inefficient driving conditions every 200 ms. This is not an absolute requirement, however, since the number of inefficient driving conditions that are monitored and the response time can vary.

The ICU also preferably includes an input device 70 and a display device 72. In one implementation, the input device is a ten key keypad 70, but the specific design of the input device can vary. The design of the input device can vary. The display device 72 provides a textual and graphical output to the driver display. In one specific implementation, the display device comprises a two line by 20 character vacuum fluorescent display.

The particular ICU used in this implementation is manufactured by Joseph Pollak of Boston, Mass. for Freightliner Corporation. The instrumentation control unit is presently available as a replacement part from Freightliner Corporation.

The Data Link

The data link 20, in this implementation, is a serial communication path connecting the ECUs together. This particular data link is designed according to SAE J1708, a standard for serial data communication between microcomputer systems in heavy duty vehicle applications. While this specific embodiment is based on the J1708 standard, it is not critical that the invention be implemented in this specific manner. One possible alternative is to use a data link constructed according to SAE J1939. The communication link need not be a shared communication path. It is also possible to connect vehicle parameter sensors (i.e., for road speed, fuel rate, RPM, torque, throttle position, etc.) directly to the ICU via discrete wiring.

In the embodiment shown in FIG. 1, the data link 40 is comprised of a twisted pair cable operating at 9600 baud. Designed according to the SAE J1708 standard, the data link forms a communication channel among the electronic control units coupled to it. Electronic control units generate a digital signal on the data link by applying a voltage differential between the two wires in the cable. A voltage differential above a specified threshold represents a logic high value, while a voltage threshold below a specified threshold represents a logic low value. This type of data link is particularly advantageous for hostile environments because the signal is more robust and impervious to signal degradation. However, other alternative communication media could be used in place of the J1708 cable.

The ECUs connected on the network communicate with each other according to protocols defined in SAE J1708 and SAE J1587. The SAE J1587 standard is entitled "Joint SAE/TMC Electronic Data Interchange Between Microcomputer Systems and Heavy Duty Vehicle Applications." This standard defines one format for data and messages communicated among microprocessors connected to a shared data link, and is specifically adapted for use with SAE J1708.

According to SAE J1708/J1587, the ECUs on the data link communicate by passing messages to each other. The ECUs can be either receivers, or receivers and transmitters. In this particular implementation, the instrumentation control unit and the engine ECU are both transmitters and receivers. For the purpose of monitoring vehicle performance data, the engine ECU acts as a transmitter, sending messages to the ICU regarding road speed, fuel rate, engine torque, RPM, throttle position, engine status, etc.

In this format, a message includes the following: 1) a module ID (MID), 2) one or more parameters (the message data), and 3) a checksum. The number of parameters in a message is limited by the total message length defined in the SAE J1708 standard. The message identification numbers are assigned to transmitter categories as identified in SAE J1587. The MID portion of a message specifies the origin or transmitter of the message. In the majority of cases, messages are broadcast on the data link without specifying a receiver. However, the message format can be extended to include the MID of a receiver after the MID of the transmitter for special applications.

The messages passed among the ECUs convey information about one or more parameters contained within the messages. According to the SAE J1587 standard, the first character of every parameter is a parameter identification character (PID). The parameter identified by the PID directly follows the PID. The SAE J1587 supports different data formats including a single character, a double data character or more than two data characters representing the parameter data. Several parameters can be packed into a message, limited by the maximum message size as noted above.

Again, in this implementation, the ECUs communicate with each other over the data link according to the SAE standard J1708. The standard describes methods for accessing the data link and constructing messages for transfer over it. It also defines a method for resource contention among the ECUs on the data link.

An ECU wishing to transmit data on the data link first waits for a lull in transmission of data on the data link. In this particular implementation, the length of the lull is 200 milliseconds. After detecting this lull, the ECU attempts to transmit its message. The transmitter broadcasts its message onto the data link. Each of the ECUs that operate as receivers on the data link will receive the message. However, receivers only act on a message if programmed to do so.

In some cases two or more transmitters may attempt to broadcast a message at one time, giving rise to a collision. To resolve a conflict among transmitters, messages have a priority according to their message identifiers. The MIDs of higher priority transmitters have a greater number of bits set at a logic level one. When more than one message is broadcast at a time, the more dominant message takes priority over lesser dominant messages. Since a lower priority message is blocked by a higher priority message, the transmitter of the lower priority message must wait and retransmit the message after another lull. An ECU on the data link will continue to attempt to send a message until it is successfully broadcast to the data link.

As introduced above, the ICU obtains vehicle performance data from the data link and uses selected parameters to detect inefficient driving conditions and compute excess fuel consumed. Table 1 below summarizes the selected parameters from the data link that the ICU uses to monitor fuel efficiency.

TABLE 1

| PID 84 | Speed |
| PID 85 | Throttle or Cruise/Service Brakes |
| PID 89 | Power Take Off (Bit 8) |
| PID 91 | Throttle Position |
| PID 93 | Engine Torque |
| PID 121 | Engine Retarder Status |
| PID 183 | Fuel Rate |
| PID 190 | RPM |

Fuel Efficiency Monitoring and Display System

The system architecture described above is used to implement a fuel efficiency monitoring and display system. The system monitors vehicle performance parameters and determines when the vehicle is consuming excess fuel. It displays a combination of graphical and numerical quantities representing fuel efficiency and the excess fuel consumed due to a fuel inefficient driving action. In addition, it displays messages to prompt the driver when it detects that excess fuel is being consumed and suggests a driving action that will improve fuel economy.

Figure 4:
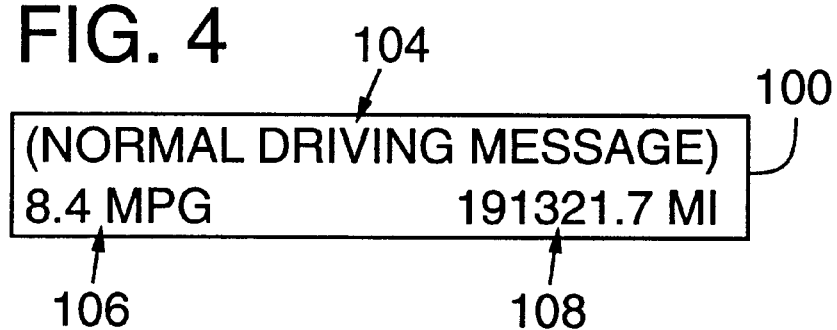
FIG. 4 is a diagram of a display format generated by the ICU in FIG. 3 to display normal driving messages.
Figure 5:
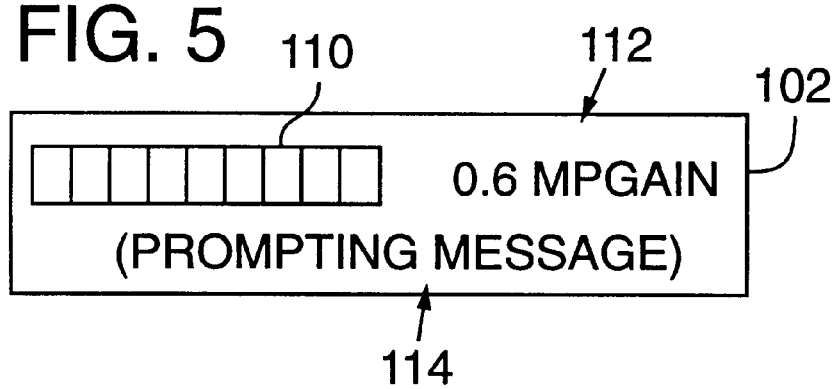
FIG. 5 is another diagram of a display format generated by the ICU to indicate inefficient driving conditions and suggest an action to improve fuel efficiency.

FIGS. 4 and 5 illustrate examples of a message display used to provide vehicle performance messages and values to the driver. During normal driving conditions, the message display provides normal driving messages. When the system detects fuel inefficient driving, it changes the display to indicate that the vehicle is consuming excess fuel and suggests an action that will improve fuel efficiency. FIG. 4 is an example of a display 100 used to display normal driving messages, while FIG. 5 is an example of a display 102 informing the driver that the vehicle is consuming excess fuel. The display in FIG. 5 replaces the one in FIG. 4 when the system detects a condition where the vehicle is consuming excess fuel.

The fuel efficiency messages tell the driver when the vehicle is consuming excess fuel, the cause of excessive fuel consumption, and messages indicating actions that the driver can take to save fuel. The fuel efficiency values are numerical representations of fuel efficiency. There are a variety of different display formats that can be used to convey fuel efficiency messages and values to the driver, and FIGS. 4 and 5 represent only one example. In the example shown in FIG. 4, the display 100 shows "normal driving" messages 104, the current fuel economy in miles per gallon 106, and an odometer reading 108. A list of some examples of normal driving messages are in Table 2 provided below.

TABLE 2

NORMAL DRIVING MESSAGES

1. MPG Bargraph
2. OUTSIDE TEMP xxx F
3. COOLANT TEMP xxx F
4. OIL PRESSURE xxx PSI
5. ENGINE OIL TEMP xxx F
6. FUEL TEMP xxx F
7. BATTERY xx.x VOLTS
8. FUEL xx.xx GAL/HR
9. TURBO BOOST xx PSI
10. TUE JUN 24 11:21 AM In an alternative implementation, the display shows other fuel efficiency information during normal driving conditions (i.e., when inefficient driving is not detected). For example, one alternative display format shows the fuel required to efficiently operate the vehicle divided by the actual fuel consumed. It also displays the miles per gallon (current fuel consumption) and an odometer reading. The ICU continually updates fuel efficiency data and presents messages and values to the driver in real time.

Whenever the ICU detects fuel inefficient driving, it changes the format of the display in FIG. 4 to another format such as the one shown in FIG. 5. The display 102 in FIG. 5 shows a bargraph 110 and a numerical value 112 depicting the magnitude of the improvement in fuel economy that could be gained by taking the action suggested by the text message 114 displayed below it.

TABLE 3

| Driving Type | Prompting Message |
| --- | --- |
| Speeding | DRIVE XX - MPH |
|  | Gain x.x MPG |
| High Engine RPM | SHIFT TO NEXT GEAR |
|  | Gain x.x MPG |
| Excessive Idling | *END IDLING* |
|  | SAVE x.xx GAL/Hr |
| Braking/Accelerating | DRIVE STEADY SPEED |
|  | Gain x.x MPG |
| Rapid Throttle Movement | MOVE THROTTLE SLOWER |
|  | Gain x.x MPG |

Figure 6:
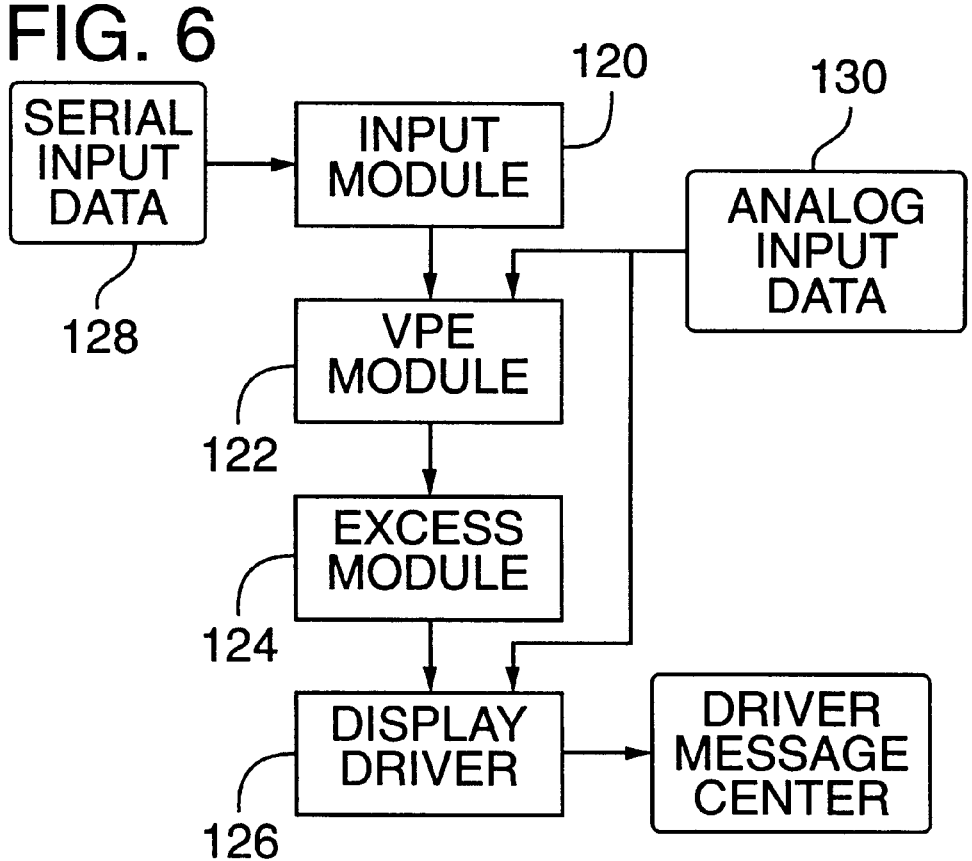
FIG. 6 is a flow diagram illustrating modules used to compute and display information about inefficient driving conditions in one embodiment of the invention.

One implementation of the fuel efficiency system comprises four software modules executing from memory on the ICU. FIG. 6 is a block diagram illustrating these modules. The following four modules are executed repetitively to compute fuel efficiency data and update the display on the dash of the vehicle: 1) INPUT 120, 2) VEHICLE PARAMETER ESTIMATION 122, 3) EXCESS 124, and 4) DISPLAY DRIVER 126.—It is important to emphasize that these modules represent one implementation of the invention and that the implementation can vary depending on a number of factors, such as the type and architecture of the performance monitoring devices in the vehicle, the type of vehicle (long haul tractor trailer truck, business class truck, car, etc.) the specific inefficient driving conditions that are monitored, etc.

The Input Module

The input module 120 converts serial input data 128 from the serial data bus into an array of asynchronous numeric values which are updated as new messages are received. Receipt of selected messages from the engine control unit is used to indicate 100 millisecond, 200 millisecond and one second time intervals. These time intervals are used to signal the arrival of new data and clock several of the subsequent modules.

The Vehicle Parameter Estimation Module

The VPE module 122 estimates the vehicles weight (GCW), aerodynamic drag factor (Beta) and the gradient (Grade) of the roadway. These estimates are derived from information available from electronically controlled engines plus an analog signal from the engine fan clutch (analog input 130). The estimated values are updated once per second and recorded in memory for use by the other modules.

The Excess module

The Excess module 124 determines the incremental portion of the fuel being consumed to operate the vehicle (if any) attributable to each of the fuel inefficient driving types. Once this is determined, the following information is updated and logged in memory of the ICU:

1) driving type consuming the largest increment of fuel inefficiently;

2) inefficient fuel consumed (start of trip to current point);

3) trip fuel (start of trip to current point);

4) short term inefficient fuel (geometric averaged); and 5) short term trip fuel (geometric averaged).

The short term inefficient and trip fuel are used to calculate the numeric value of "FUEL EFFICIENCY" which is displayed to the driver.

The Display Driver Module

The Display Driver module 126 reads the analog inputs from the dash mounted driver operated keypad (Analog input 130) to select preprogrammed messages available for display in the driver message center. Current numeric values (if needed) are inserted into the message displayed. One of the options available to the driver is the display 100 shown in FIG. 4.

Software Description

The logic employed in each of these software modules is described in the following sections.

The Input Module

The Input module 120 employs a parser to select, parse and record into the array (called the PID array) all messages from the engine ECU. The ICU receives vehicle performance data from the data link in a serial data stream. As noted above, messages on the data link include an ID, followed by one or more parameters, and a checksum. The parser, executing in the ICU, uses the ID to identify the message and the size of the parameters in the message (single byte or multi-byte data), and temporarily stores the parameters in memory of the ICU. The parser then verifies that the data is valid by evaluating the checksum. If the data is valid, it updates the PID array with the parameters from the message.

At power on, all values in the PID array are set to zero. This module is executed as frequently as possible to insure that the most current information from the engine control unit is available for use by the other software modules. Flags are set whenever updated engine torque (PID 93 once per second), fuel rate (PID 183 five times per second) or RPM (PID 190 ten times per second) messages are received.

The Vehicle Parameter Estimation Model

The VPE module 122 utilizes the information generated by the INPUT module to estimates the vehicle's weight (GCW), aerodynamic drag factor (Beta) and the gradient (Grade) of the roadway. Unless otherwise stated, information from the prior iterations is read from memory as an input at power on, and updated and stored in memory when the system is powered down. This module is executed once per second when the engine torque (PID 93) information is updated and recorded in memory for use by the other modules. VPE utilizes the following inputs defined in Table 4:

TABLE 4

| VARIABLE | DEFINITION |
|---|---|
| % GR | the gradient of the roadway which is iteratively estimated and updated by the VPE module. The initial startup value of % Gr is zero. |
| Beta | the aerodynamic drag factor which is iteratively estimated and updated by the VPE module. The initial startup value of Beta is 0.085. |
| DTeff | the mechanical efficiency of the drivetrain. It is stored as a constant in memory. |
| FSum | the sum of the longitudinal force driving the vehicle during each of the n iterations. The initial startup value of FSum is zero. |
| GCW | the estimated gross weight of the vehicle. |
| hpL | the average parasitic engine horsepower loss excluding the engine cooling fan. "hpL" is stored as a constant in memory. |
| n | a counter which records the number of iterations (seconds) of summing and updating of data. Its initial startup value is zero. |
| PID | a 256 element data array which contains the most recent information from the J1587/1708 data bus for MID 128 (Engine). PID is updated by the INPUT module. |
| r | the rolling resistance coefficient of the vehicle. It is stored as a constant in memory. |
| V^2Sum | the sum of the squares of the vehicles velocity during each of the n iterations. The initial startup value of V^2Sum is zero. |
| VSum | the sum of the vehicles velocity during each of the n iterations The initial startup value of VSum is zero. |
| Vo | the vehicles velocity at the start of the summing process. The initial startup value of Vo is zero. |

Figure 7A:
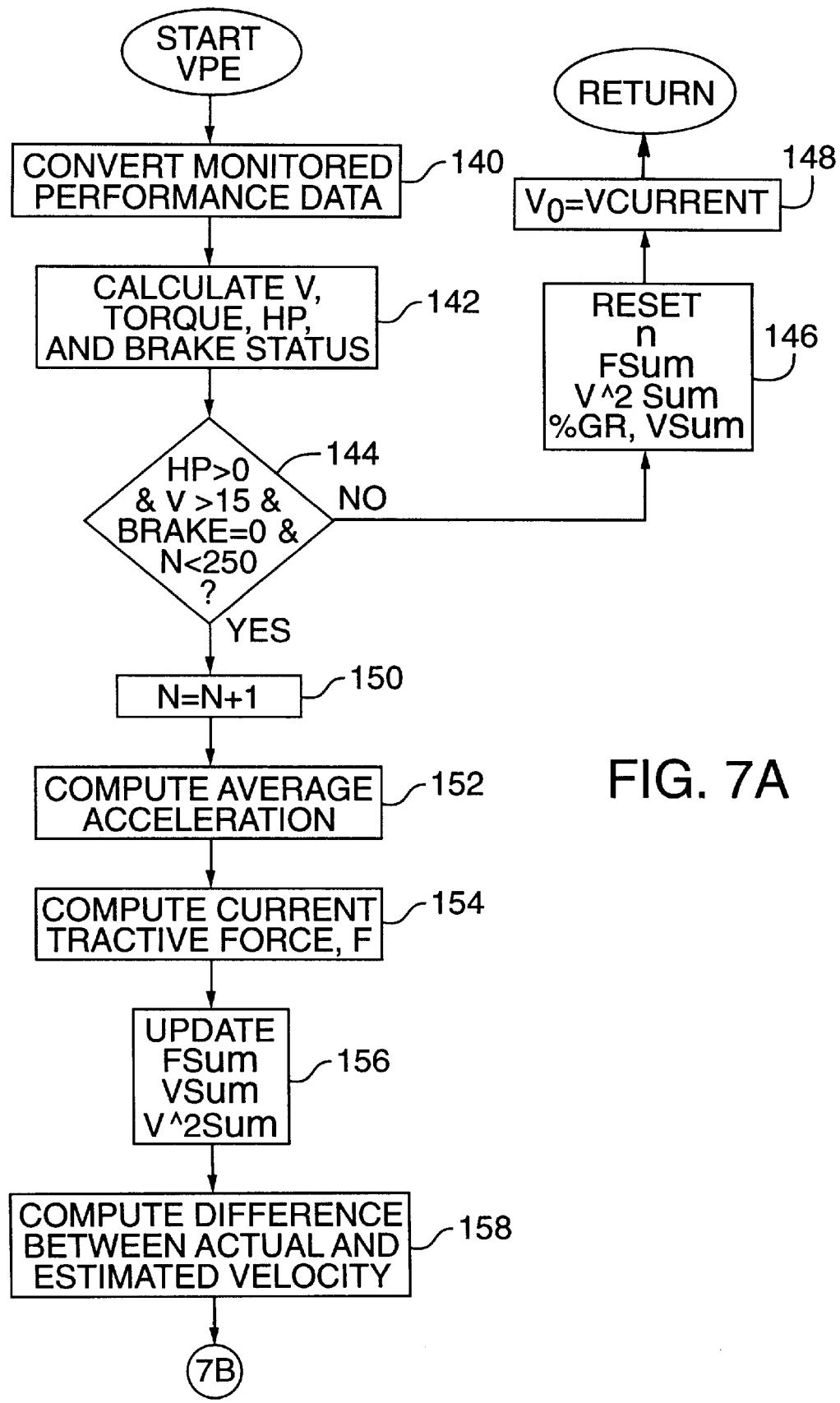
FIGS. 7A and 7B are a flow diagram illustrating an implementation of the Vehicle Parameter Estimation Module of FIG. 6.
Figure 7B:
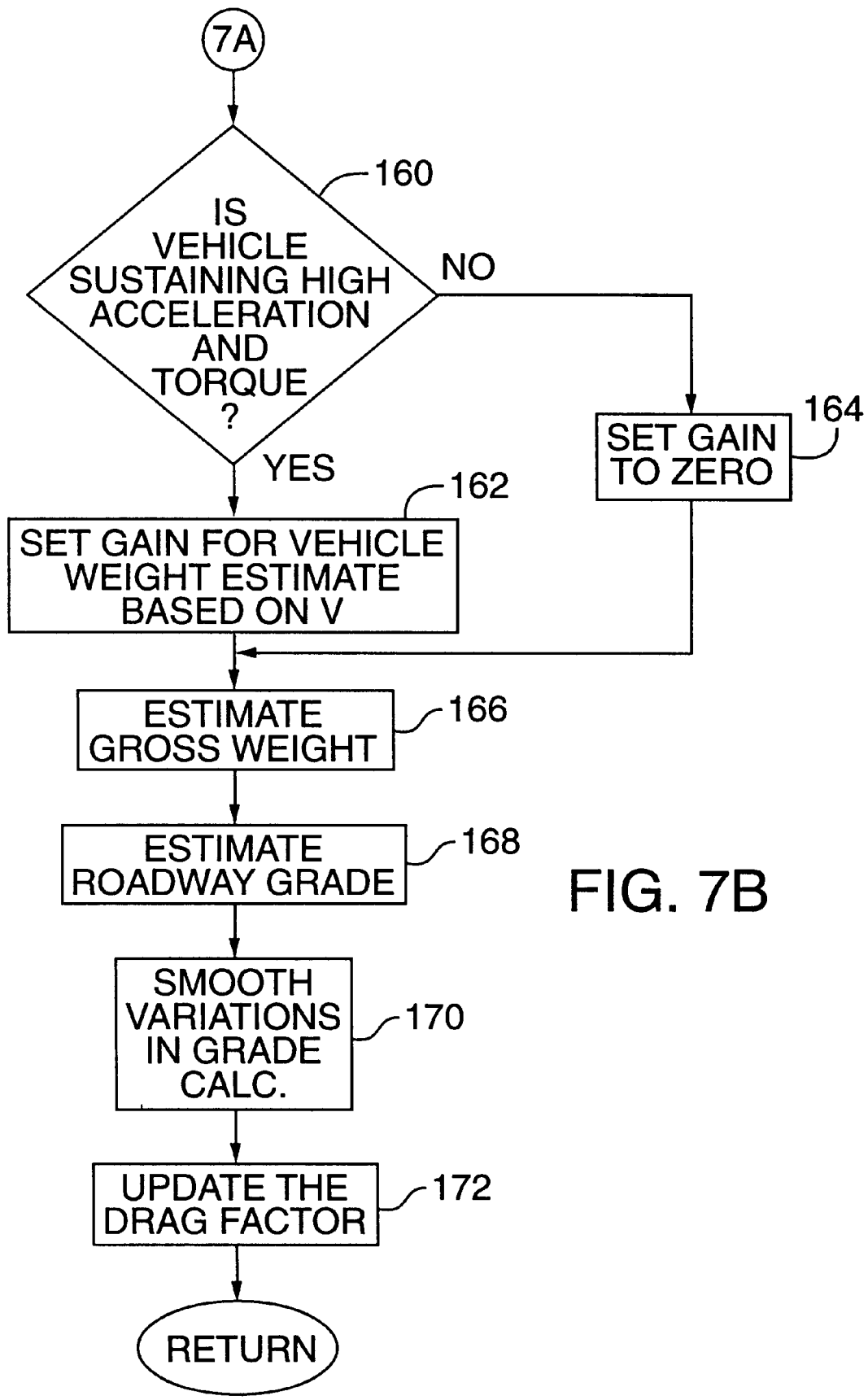

Vehicle Parameter Estimation or VPE includes two parts. The first part (Part 1) uses information from the PID array to determine if the operating conditions are correct for updating the parameter estimates. The second part (Part 2) performs the necessary calculations and updates the parameter estimates if the necessary conditions are met. FIGS. 7A and 7B are a flow diagram illustrating the operation of both of these parts of the VPE module 122. The reference numbers associated with the steps in the flow diagrams are set forth in parentheses next to the corresponding description in the text below.

Part 1 of the VPE Module

The first part of the VPE module converts the data from selected elements in the PID array to the information used throughout VPE as shown in step 140 (FIG. 7A). In addition, Part 1 assigns the value of zero or one to the variable Case which is used as the basis for updating the parameter estimates. First, it calculates the value of the following variables as defined below (also see step 142, FIG. 7A).

Part 1 of the VPE module sets a parameter, Brake, equal to one if either the brakes are applied (bit six of PID 85 is equal to one) or the engine retarder is operating (bit 8 of PID 121 is equal to one).

The VPE module computes the vehicle velocity, engine torque and horsepower from selected PID values stored in the PID array.

V (vehicle velocity)=PID 84*0.7335

Torque (engine torque)=PID 93*20

HP (horsepower)=Torque*PID 190/21009−hpL

The last step of Part 1 is to set Case=1 if all of the following are met (decision step 144 of FIG. 7A):

HP is greater than zero,

V is greater than 15,

Brake=0, and n is less than 250.

Otherwise, it sets Case=0

Part 2 of the VPE Module

Part 2 has two cases. If Case (from Part 1) equals zero, then the variables n, FSum, V^2Sum, % Gr and VSum are set equal to zero (146) and the value of the variable Vo equal to the current vehicle velocity (148).

If Case equals one, then the VPE module increments the counter n by one; i.e., $n = n+1$ (step 150)

It then computes the average acceleration (a) (152) using the equation $$a = (V-Vo)/n/32.2$$

and the current tractive force (F) (154) using the equation $$F = 550 * HP * DTeff/V$$

Next, the VPE module updates the sums used for estimating the parameters as follows (156):

$$FSum = FSum + F,$$

$$VSum = VSum + V, \text{ and}$$

$$V^2Sum = V^2Sum + V^2$$

From this information, the difference between the actual and the estimated vehicle velocity (e) is computed using the following equation (158):

$$e = V - Vo - 32.2 * ((FSum - Beta * V^2Sum)/GCW - n*r)$$

If the vehicle is sustaining a high acceleration and torque (n>5 & a>0.011 & Torque>500)(decision step 160), then it selects the gain (p) for the vehicle's weight estimate update as follows (162).

If the vehicle's velocity is less than 70 (V<70), the VPE module sets p=500000.

If the vehicle's velocity is not less than 70, it sets p=100000.

Otherwise, it sets the gain to zero, p=0 (164). The estimated gross weight is calculated using the following equation (166):

$$GW = GW - p*e/GW*(V - Vo + 32.2*r).$$

In this implementation, the gross weight is computed incrementally based on the previous value of the gross weight, the gain factor (which depends on whether the vehicle is sustaining high acceleration and torque), the estimated velocity, and the rolling resistance.

Next, the estimated percent roadway grade (gr) is calculated using the following equation (168):

$$gr = 100 * ((FSum - Beta * V^2Sum)/n/GCW - a - r)$$

The variations in the estimated value of the roadway grade are smoothed using the following equation (170):

$$Gr = 0.8 * Gr + 0.2 * gr$$

Finally, the VPE module updates the drag factor as shown in step 172. If the absolute value of the variation in the vehicle's velocity is greater than 0.5 [abs(V−VSum/n)>0.5], then the VPE module uses the following equation to determine if the estimated grade increased or decreased:

$$Dg = \text{sign}(Gr - gr), \text{ otherwise set } Dg = 0.$$

The sign function returns the value +1, 0 or −1 if the value of the argument (Gr−gr) is greater than, equal to or less than zero, respectively. If the vehicle is operating at a sustained velocity greater than 70 with a low acceleration [V>70 & abs(a)<0.011], then the VPE module uses the following equation to determine if the vehicles velocity is increasing or decreasing:

$$DV=\text{sign}(V-V\text{Sum}/n), \text{ otherwise set } DV=0.$$

The VPE module then estimates the drag factor using the equation:

$$\text{Beta}=\text{Beta}+0.0001*DV*Dg.$$

Note that the drag factor is computed incrementally based on its previous value and whether the vehicle speed and grade are increasing or decreasing.

The Excess Module

One implementation of the Excess Module is composed of nine sub-modules which operate iteratively to identify unnecessary or inefficient fuel use—if any. Unless otherwise stated, information from the prior iterations is read from memory as an input at power on, updated by one or more of the sub-modules and stored in memory when the system is powered down. Execution of all of these sub-modules is triggered when the fuel rate (PID 183) information is updated—five times per second. The sub-modules within the Excess module utilize the following inputs:

TABLE 5

| | |
|---|---|
| AFuel | the accumulated fuel (in gallons) used from the start of the trip due to operating the vehicle at speeds above a predetermined speed, SLim. AFuel is initialized to zero when a new trip is inaugurated. The initial startup value of AFuel is zero. |
| BAI | a brake application indicator which is set equal to one to show that an initial braked speed has been recorded. BAI is updated by a Braking/Accelerating sub-module and initialized to zero when a new trip is inaugurated. The initial startup value of BAI is zero. |
| BASc | the confirmed brake application speed. It is calculated such that the difference in the vehicle's kinetic energies between BASc and BRSc (see below) represents the accumulated braked change in the vehicle's kinetic energy. BASc is updated by the Braking/Accelerating sub-module and initialized to zero when a new trip is inaugurated. The initial startup value of BASp is zero. |
| BASp | the vehicle speed (in mph) when the brakes are applied. BASp is updated by the Braking/Accelerating sub-module and initialized to zero when a new trip is inaugurated. The initial startup value of BASp is zero. |
| BRSc | represents the speed at which the vehicle's brakes were last released which produced a confirmed loss of kinetic energy - modified by the speed/time criteria. The Braking/Accelerating sub-module updates BRSc which is initialized to zero when a new trip is inaugurated. The initial startup value of BRSc is zero. |
| BRSp | the vehicle speed (in mph) when the brakes are released. The Braking/Accelerating sub-module updates BRSp, which is initialized to zero when a new trip is inaugurated. The initial startup value of BRSp is zero. |
| Beta | the estimated aerodynamic drag factor, an input from VPE module. |
| BFuel | the accumulated fuel (in gallons) used from the start of the trip due to unnecessary braking/accelerating. BFuel is initialized to zero when a new trip is inaugurated. The initial startup value of BFuel is zero. |
| Brake | indicates when the vehicle is being retarded (Brake = 1) by either the service brakes or engine retarder. It is updated each iteration by combining (logical OR) the status of service brakes (bit 6 of PID 85) and the engine retarder (bit 8 of PID 121). |
| Cruise | indicates when the vehicle is operating in cruise control (Cruise = 1). It is updated each iteration based of the value of bit 8 of PID 85. If bit 8 is set to one, then the ICU sets Cruise to one. |

TABLE 5-continued

| | |
|---|---|
| DTeff | the mechanical efficiency of the drivetrain. DTeff is stored as a constant in memory. |
| Et | the time in seconds since the brakes were last released. Et is initialized to zero when a new trip is inaugurated. The initial startup value of Et is zero. |
| FPI | the fuel per iteration. It is updated each iteration by dividing the fuel rate (PID 183) by 1152000 which provides the gallons of fuel consumed for each 200 ms interval. |
| GVW | the estimated gross vehicle weight, an input from the VPE module. |
| IFuel | the accumulated fuel (in gallons) used from the start of the trip due to idling the vehicle for periods longer than the idle time limit. IFuel is initialized to zero when a new trip is inaugurated. The initial startup value of IFuel is zero. |
| ILim | the maximum time in seconds which the engine can idle before engine idling is considered as inefficient use of fuel. ILim is stored as a constant in memory. |
| ITime | the accumulated time in seconds which the engine has been idling from the start of the trip. ITime is initialized to zero when a new trip is inaugurated. The initial startup value of ITime is zero. |
| Itime | the time in seconds which the engine has been idling for the current idling event. ITime is initialized to zero when a new trip is inaugurated. The initial startup value of ITime is zero |
| LSLim | the minimum speed necessary before inefficient fuel use is computed. Below this speed inefficient fuel use is not computed. LSLim is stored as a constant in memory. |
| MFuel | the accumulated fuel (in gallons) used from the start of the trip due to rapid throttle movement. MFuel is initialized to zero when a new trip is inaugurated. The initial startup value of MFuel is zero. |
| Over | the maximum value of the ratio of current Specific Fuel consumption SFC divided by average Specific Fuel Consumption SFCa which is allowed before excess or inefficient fuel is accumulated. Over is stored as a constant in memory. |
| PID | an array which contains the most recent information for PID's 0 through 253 from the J1587/1708 data bus for MID 128 (Engine). This array is updated by the INPUT module. |
| PTO | indicates if the power take off is operating (PTO = 1). It is updated each iteration based of the value of bit 8 of PID 89. |
| RAt | the time between release of the throttle and application of the brakes or release of the brakes and application of the throttle. RAt is initialized to zero when a new trip is inaugurated. The initial startup value of RAt is zero. |
| RFuel | the accumulated fuel (in gallons) used from the start of the trip due to operating the engine at speeds greater than the engine speed limit. RFuel is initialized to zero when a new trip is inaugurated. The initial startup value of RFuel is zero. |
| RLim | the minimum engine speed in RPM above which increased engine speed is considered as inefficient use of fuel. RLim is stored as a constant in memory. To accommodate various engine speed ratings, its value should be initialized based on information from the engine ECU at power on. |
| Sa | the short term average vehicle speed in miles per hour for vehicle speeds greater than 55 and less than 75 mph. The initial start up value of Sa is 55. |
| SFCa | the geometric average (or initial) specific fuel consumption of the engine in gallons per horsepower hour. SFCa is initialized to 0.05 when a new trip is inaugurated. The initial startup value of SFCa is 0.05. |
| SLim | the maximum speed in MPH which the vehicle can be operated before it is considered to be speeding. SLim is an input which can be varied as the program is operating. |
| TBt | the maximum time in seconds between release of the brakes and application of the throttle or release of the throttle and application of the brakes for these release applications to be considered as inefficient use of fuel. TBt is stored as a constant in memory. |
| TFuel | the total fuel (in gallons) used from the start of the trip. TFuel is initialized to zero when a new trip is inaugurated. The initial startup value of TFuel is zero. |

TABLE 5-continued

| | |
|---|---|
| TFuela | the value of the geometrically averaged total trip fuel. TFuela is initialized to zero when a new trip is inaugurated. The initial startup value of TFuela is zero. |
| TLim | the maximum ramp rate of the throttle position (percent per second) which is allowable before throttle movement is considered for inefficient use of fuel. TLim is stored as a constant in memory. |
| Tmin | the minimum throttle position (in percent) which is allowed before excess or inefficient fuel is accumulated. Tmin is stored as a constant in memory. |
| Xces | the total excess or inefficient fuel used from the start of the trip. Xces is initialized to zero when a new trip is inaugurated. The initial startup value of Xces is zero. |
| Xcesa | the value of the geometrically averaged total excess or inefficient fuel used from the start of the trip. Xcesa initialized to zero when a new trip is inaugurated. The initial startup value of Xcesa is zero. |

The nine sub-modules which make up the Excess module are—Parameters, Speed, RPM, Idling, Braking/Accelerating, Throttle, Total, Display and Average.

The Parameters Sub-module

Figure 8:
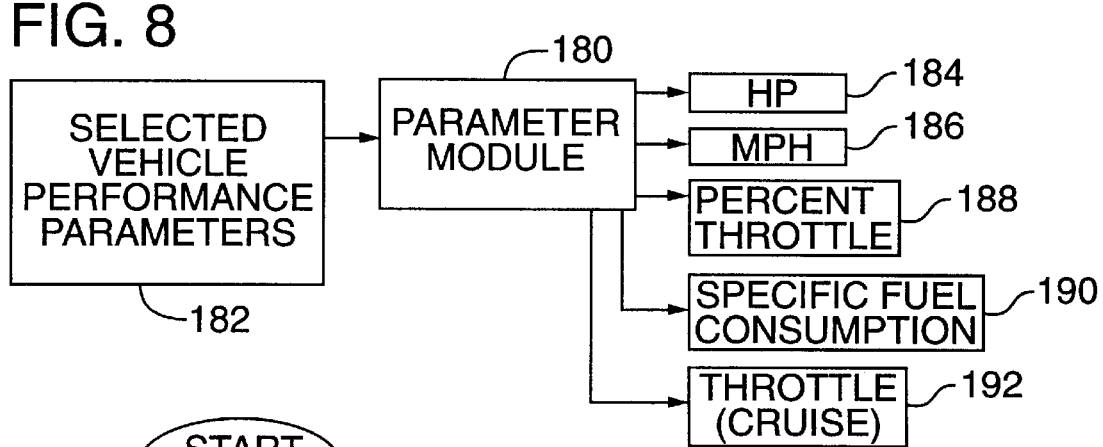
FIG. 8 is a block diagram depicting a parameter sub-module in the excess module shown in FIG. 6.

The Parameters module converts the data from selected elements in the PID array to information used throughout the Excess module. FIG. 8 is a block diagram summarizing the inputs and outputs of the parameters module 180. As shown, the parameters module reads selected vehicle performance parameters (182) and computes a series of vehicle performance parameters including horsepower (184), vehicle speed (MPH, 186), throttle position (188), specific fuel consumption (190), and status of the throttle (whether or not cruise control is active) (192). The variables—with their definitions—generated by this sub-module are:

$$HP \text{ (horsepower)} = PID\ 93 * PID\ 190/1050.$$

190/k where k is a constant. The specific value of k can vary depending on the vehicle. Based on experimentation, acceptable values for k include 1050.4 and 262.61.

If the engine torque is negative, set HP equal to zero.

MPH (speed of the vehicle in miles per hour)=PID 84/2

PT (percent throttle)=PID 91/2.55

RPM (engine speed in revolutions per minute)=PID 190/4

SFC (specific fuel consumption in gal/hp hr)=PID 183/HP/64

If the engine horsepower is zero, the ICU sets SFC equal to zero.

TC (Throttle or Cruise)=1 or 0 TC equals one if PT is greater than Tmin or bit 8 of PID 85 equals one (Cruise Control Engaged).

FPI (fuel per iteration in gallons)=Frate/18000.

The parameters module also computes a quantity representing the ratio of vehicle velocity and engine RPM The Speeding Sub-module The Speeding sub-module calculates the fuel consumed (if any) due to increased aerodynamic drag when the vehicle speed exceeds the current vehicle speed limit. The current speed limit is computed dynamically based on recent readings of the vehicle's speed. For example, in the implementation described below, the current speed limit is dynamically updated based on the difference between the short term average speed and the current vehicle speed.

Figure 9A:
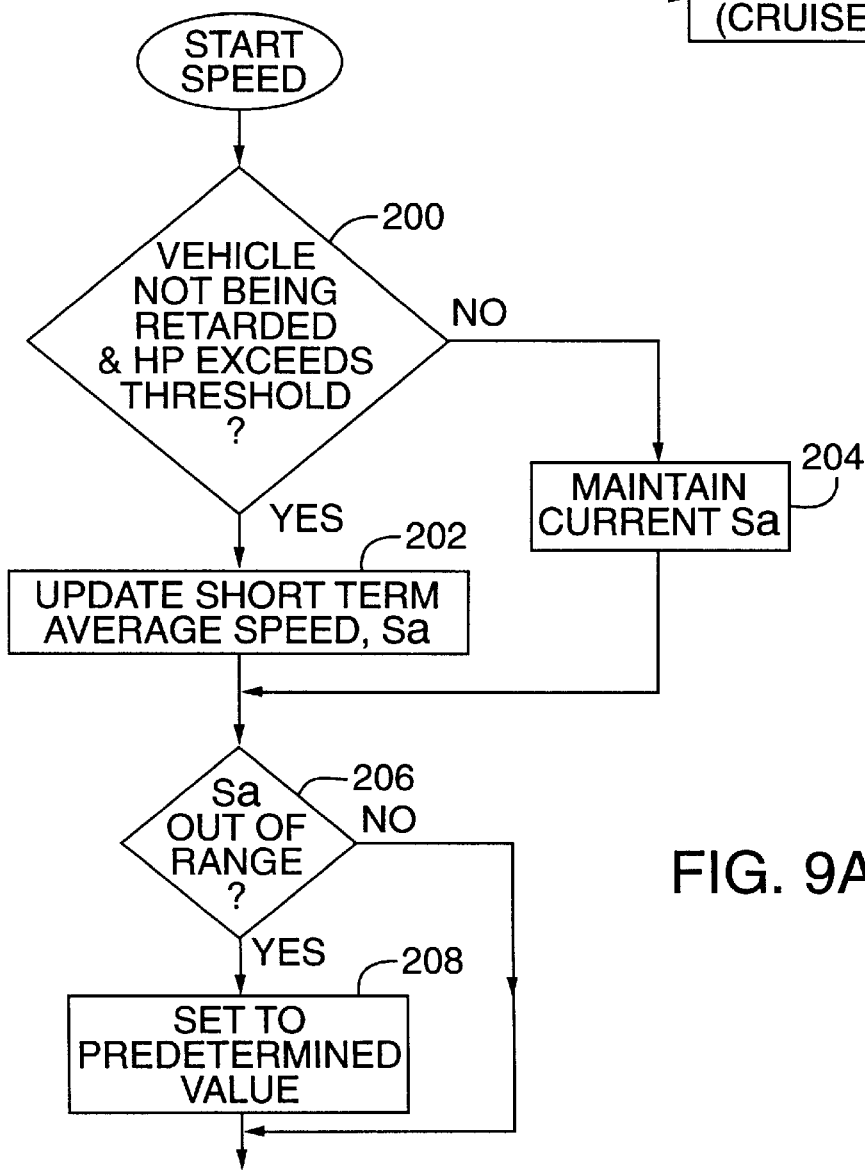
FIGS. 9A and 9B are a flow diagram of speed sub-module in the excess module for detecting inefficient fuel use due to speeding.
Figure 9B:
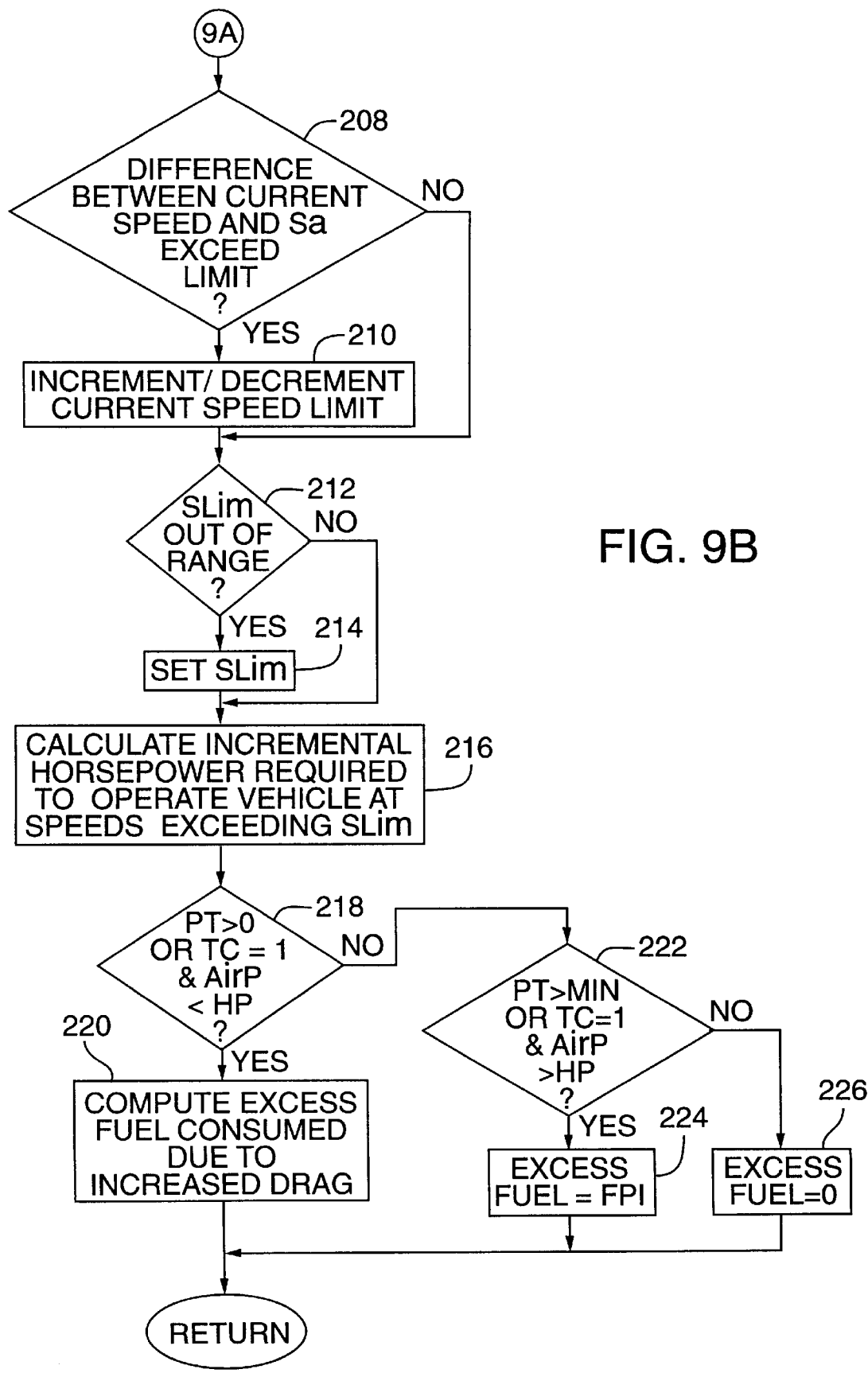

FIGS. 9A and 9B show a flow diagram depicting an implementation of the speeding module. The first step is to update the current vehicle speed limit using the following adaptive approach. Provided that the vehicle is not being retarded (Brake=0) and the engine horsepower exceeds 50 (HP>50) 200, the speed module updates the short term average vehicle speed (Sa) as shown in Step 202 using the following equation, $$Sa = 0.99 * Sa + 0.01 * MPH.$$

Otherwise, it maintains the current value of Sa as shown in Step 204; i.e., $$Sa = Sa.$$

Next, the speeding module determines whether the short term average speed is within a predetermined operating range as shown in decision block 206. If the short term average speed is less than 55 mph or greater than 75 mph, it sets Sa equal to 55 or 75, respectively (208).

The speeding module then determines the variation between the current vehicle speed and the short term average to evaluate whether to update the current speed limit.

When the variation between the short term average vehicle speed and the current vehicle speed limit exceeds 4 mph (positively or negatively; i.e., abs(Sa−SLim)<4) (208), the speeding module increments/decrements the current vehicle speed limit by 5 mph (210); i.e., $$SLim = SLim + 5 * \text{sign}(Sa - SLim).$$

Otherwise, it maintains the current value of SLim.

Note that the sign function assumes the value +1, 0 or −1 if the argument (Sa−SLim) is greater than, equal to or less than zero respectively.

The speeding module limits the value of SLim to a predetermined range, e.g., between 55 and 75, as shown in Steps 212 and 214. If SLim is less than 55 or greater than 75 mph, then it sets SLim equal to 55 or 75, respectively.

Next, the speeding module calculates the incremental horsepower required to operate the vehicle (AirP) at speeds exceeding the current vehicle speed limit (SLim) as shown in Step 216. If the current vehicle speed is greater than the vehicle speed limit plus two miles per hour (MPH>SLim+2) to allow for normal speed variations then, it calculates the incremental horsepower required due to increased aerodynamic drag (AFuel) using the equation, $$AirP = Beta * (MPH^{\wedge}3 - Sref^{\wedge}3) * /DTeff/175.91$$

Otherwise, it sets AirP equal to zero.

If the throttle position is greater than the minimum throttle position or cruise is engaged (TC=1) and the incremental aerodynamic horsepower is less than the engine horsepower (218) then, the speed module calculates the inefficient fuel consumed due to the increased aerodynamic drag resulting from the higher operating speed (AFuel) as shown in Step 220. It uses the equation, $$AFuel = AirP * SFCa/18000$$

If the throttle position is greater than the minimum throttle position or the cruise is engaged (TC=1) but the incremental aerodynamic horsepower is not less than the engine horsepower (222) then, it sets the inefficient fuel consumed (AFuel) equal to all the fuel consumed during the current iteration as shown in Step 224; i.e., $$AFuel = FPI.$$

Otherwise, it sets AFuel equal to zero.

The RPM Sub-module

The RPM sub-module calculates the increase in fuel consumption (if any) due to operating the engine at speeds higher than necessary for operation of the vehicle. It employs the heuristic criteria that fuel consumption is reduced by 1.5% per 100 rpm reduction in engine operating speed.

The RPM module detects special cases where a high RPM is justified and does not compute excess fuel in these cases. One special case is for operating the engine at higher speeds to provide additional horsepower for accelerating, climbing grades, down shifting, etc. Although empirical, these requirements are addressed by simply adding one half the current engine horsepower to the allowable engine speed (RLim) before computing inefficient fuel consumption.

Setting the allowed engine speed to 1550 (RLim=1550) has provided good results with 1800 rpm engines and 9/10 speed transmissions (30–40% gear steps). This method can be generalized to address higher rpm engines (1900–2200 rpm) and/or other transmissions.

A second special case is for operating the engine at high speeds when down shifting. This case is addressed by eliminating all conditions where the ratio of the vehicle speed divided by the engine speed is changing (clutch disengaged or transmission in neutral) before computing inefficient fuel consumption.

Also, all conditions where the throttle position is less than the minimum throttle position or the vehicle speed is less than the low speed limit are eliminated before computing inefficient fuel use.

Figure 10:
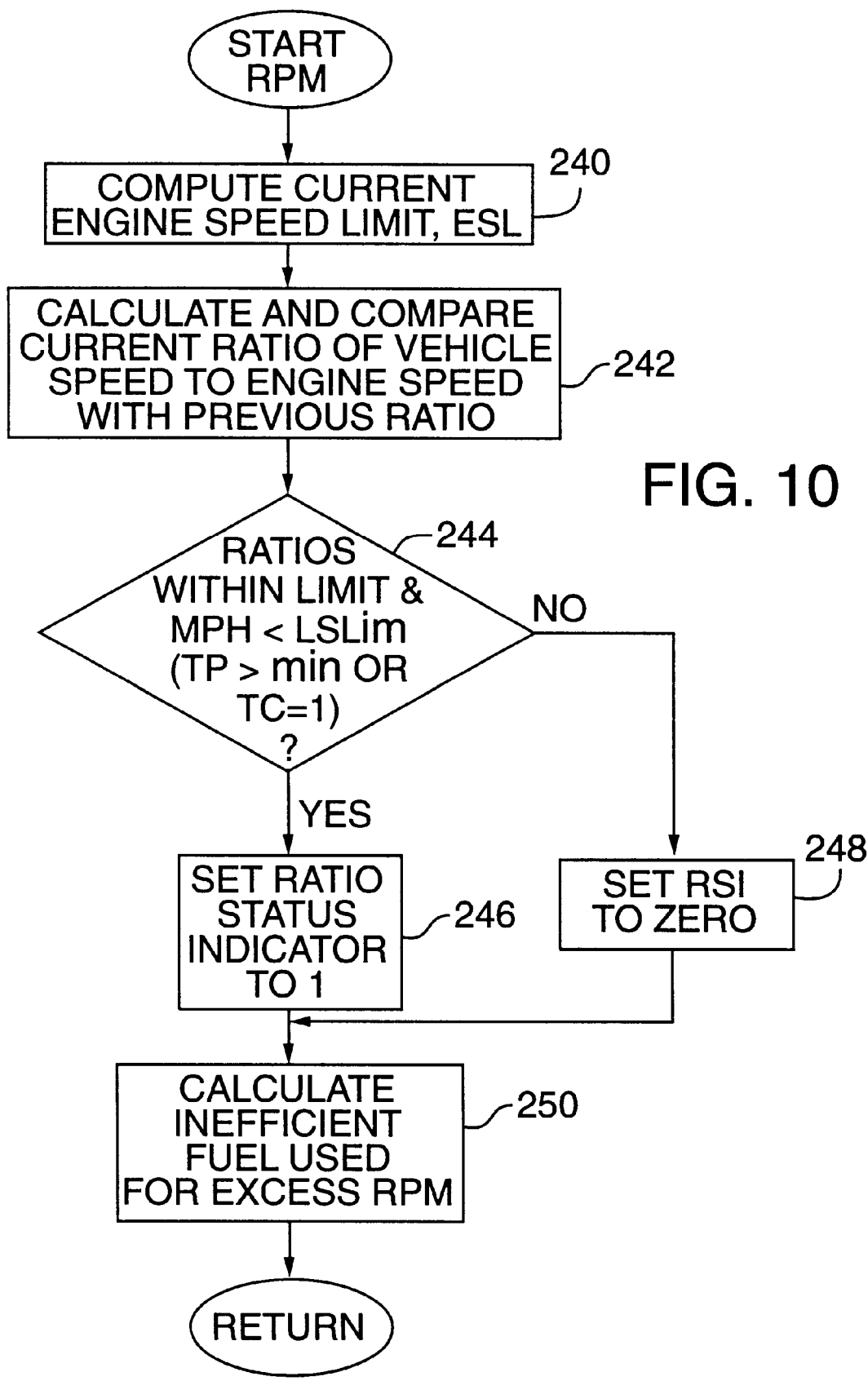
FIG. 10 is a flow diagram of an RPM sub-module in the excess module for detecting inefficient fuel use due to operating the vehicle at a high RPM.

FIG. 10 is a flow diagram illustrating an implementation of the RPM module. As shown in FIG. 10, the first step is to calculate the current engine speed limit (ESL) by summing the engine RPM limit plus one half the current engine horsepower as shown in Step 240 of FIG. 10; i.e., $$ESL=RLim+HP/2.$$

Next, the value of the current vehicle speed (MPH) divided by the current engine speed (RPM) is calculated and compared to the previous vehicle speed/engine speed ratio (VEr) value as shown in Step 242. If the following conditions are satisfied:

1) the current and previous vehicle speed/engine speed ratios are within two percent,
2) the engine speed is greater than the engine speed limit (RPM>ESL), p1 3) the vehicle speed is greater than the low speed limit (MPH>LSLim), and
4) the throttle position is greater than the minimum throttle position or cruise is engaged (TC=1) (244), then the RPM module sets the ratio status indicator (RSI) high (246); i.e., RSI=1. Otherwise, it sets RSI=0 (248).

The last step is to calculate the inefficient fuel used due to excessive engine speed (RFuel) as shown in Step 250. This implementation of RPM module uses the empirical equation $$RFuel=RSI*(RPM-Rlim)*FPI*0.00015.$$

The excess fuel is proportional to the amount by which the current RPM exceeds the engine speed limit. For example, the excess fuel is 1.5% per 100 RPM over a preprogrammed engine speed limit. As noted above, the engine speed limit is chosen based on empirical evidence and varies depending on the engine in the vehicle.

The description above represents one implementation of the RPM module. In a second implementation, the computations used to determine whether a shift has occurred are modified slightly. The ICU determines whether a shift has occurred based on the ratio of vehicle velocity to engine RPM (VEr). When a shift occurs, the ratio of vehicle to engine velocity changes. By detecting that the ratio has changed by more than a predetermined threshold (e.g., two or three percent), the ICU can detect when a shift has or is occurring. It is sometimes beneficial to filter the value of VEr using an expression of the form VEr=k(MPH/RPM)+(1−k)VErp, where k is a filtering coefficient and VErp is the previous value of the ratio. It is also beneficial to use filtering to update the value of VEr slowly when a shift has occurred.

The second implementation the Excess module evaluates whether a shift is or has occurred by determining the change in the ratio of vehicle velocity to engine speed. The Excess module makes this determination in the parameters module rather than the RPM module. In this version, the parameters module updates VEr by filtering it and also uses filtering to update VEr when a shift has occurred. The result of the shift determination is reflected in the variable RSI, which is a binary value indicating the presence of a shift. The value of RSI is then used in a preprocessing step in the RPM module and the throttle module to determine whether excess fuel should be evaluated. The presence of a shift justifies high RPM and rapid throttle movement, and thus, serves as a prerequisite to computing excess fuel in the RPM and throttle modules.

The Idling Sub-Module

The idling sub-module calculates the excess fuel consumed (if any) due to engine idling. Idling is defined as operation of the engine when the vehicle speed is less than 2 mph without the PTO engaged for a time period in excess of the idle time limit.

Figure 11:
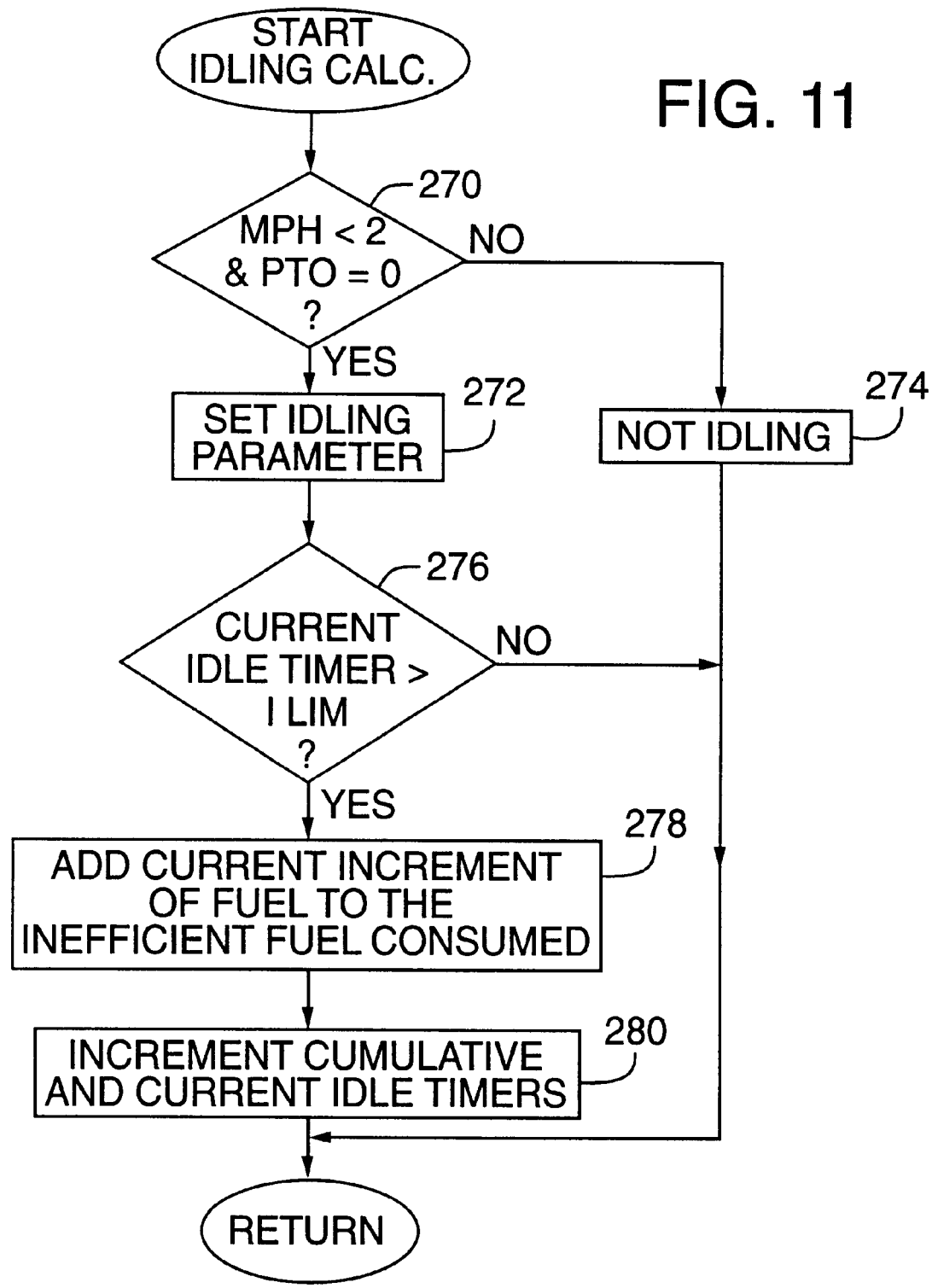
FIG. 11 is a flow diagram of an idling sub-module in the excess module for detecting inefficient fuel use due to excessive idling.

FIG. 11 is a flow diagram illustrating an implementation of the idling module as shown in decision Step 270. The first step in this module is to determine if the engine is idling. If the vehicle speed is less than 2 and the PTO is not engaged (MPH<2 and PTO=0) (270), then it sets the idling parameter to one, Idling=1 (272). Otherwise, it sets the idling parameter to zero, Idling=0, meaning that the vehicle is not idling (274).

If the engine is idling and the current idle timer is greater than the idle time limit (Idling=1 and Itime>ILim) (276), then the idling module adds the current increment of fuel to the fuel consumed idling as shown in Step 278; i.e., IFuel=IFuel+FPI. Otherwise, it sets IFuel=IFuel.

The last step (280) is to increment the cumulative and current idle timers by 200 ms if the engine is idling (Idling=1); i.e., ITime=ITime+0.2. Otherwise, it leaves the idling time unchanged for the current iteration, ITime=ITime.

The Braking/Accelerating Sub-Module

The Braking/Accelerating sub-module calculates the change in the vehicle's speed (kinetic energy) while braking and the elapsed time between braking/accelerating events to determine if the braking resulted in increased fuel consumption. Braking is considered necessary if any of the following rules are true:

Braking reduces the vehicles speed below the Low Speed Limit (LSLim)—an input.

The time between release of the throttle and application of the brakes or release of the brakes and application of the throttle (Release/Application time—RAt) exceeds the Throttle/Brake time (TBt)—an input.

In this implementation, information about braked changes in the vehicle's kinetic energy is stored in two states—pending and confirmed. The confirmed state stores the speed at which the vehicle's brakes were last released which produced a confirmed loss of kinetic energy—modified by the speed/time criteria. This speed is identified as the confirmed Brake Release Speed (BRSc). In addition, a second higher speed identified as the confirmed Brake Application Speed (BASc) is computed and stored. The value of BASc is calculated such that the difference in the vehicle's kinetic energy between these two speeds represents the accumulated braked change in the vehicle's kinetic energy. This accumulated braked change in kinetic energy represents the potential increase in fuel consumption. The change in kinetic energy due to braking the vehicle is converted to an equivalent quantity of fuel as the vehicle's speed increases from BRSc to BASc unless the following conditions are met:

1) the vehicle's speed drops below the low speed limit (LSLim), or
2) the throttle application is less than Tmin percent or does not increase the vehicle's speed above the speed/time criteria defined by recursively modifying the confirmed brake release speed (BRSc) using the equation:

$$BRSc_t = BRSc_{t-1} * \exp(0.0002 * Et)$$

where Et is the time in seconds since the brakes were released. To evaluate the second condition, the ICU monitors the speed increase rate after the driver applies the brakes. If the driver accelerates faster than a predetermined rate, then the ICU proceeds to evaluate whether excess fuel is being consumed due to rapid acceleration after a brake event.

The pending state stores the most recent braked change in the vehicle's speed; e.g., the most recent speed at which the brakes were applied (BASp) and released (BRSp). If the brakes are still applied, BRSp is the current vehicle speed. When the classification process is completed, the braked speed change is either determined to be necessary (no change in the confirmed state) or unnecessary. For unnecessary vehicle speed changes, the kinetic energy in the confirmed state is increased by the amount of kinetic energy lost in the vehicle's speed change. In addition, the confirmed state speed BRSc is updated to BRSp and BASc is recalculated to reflect the increased braked change in kinetic energy and the updated BRSc.

Figure 12A:
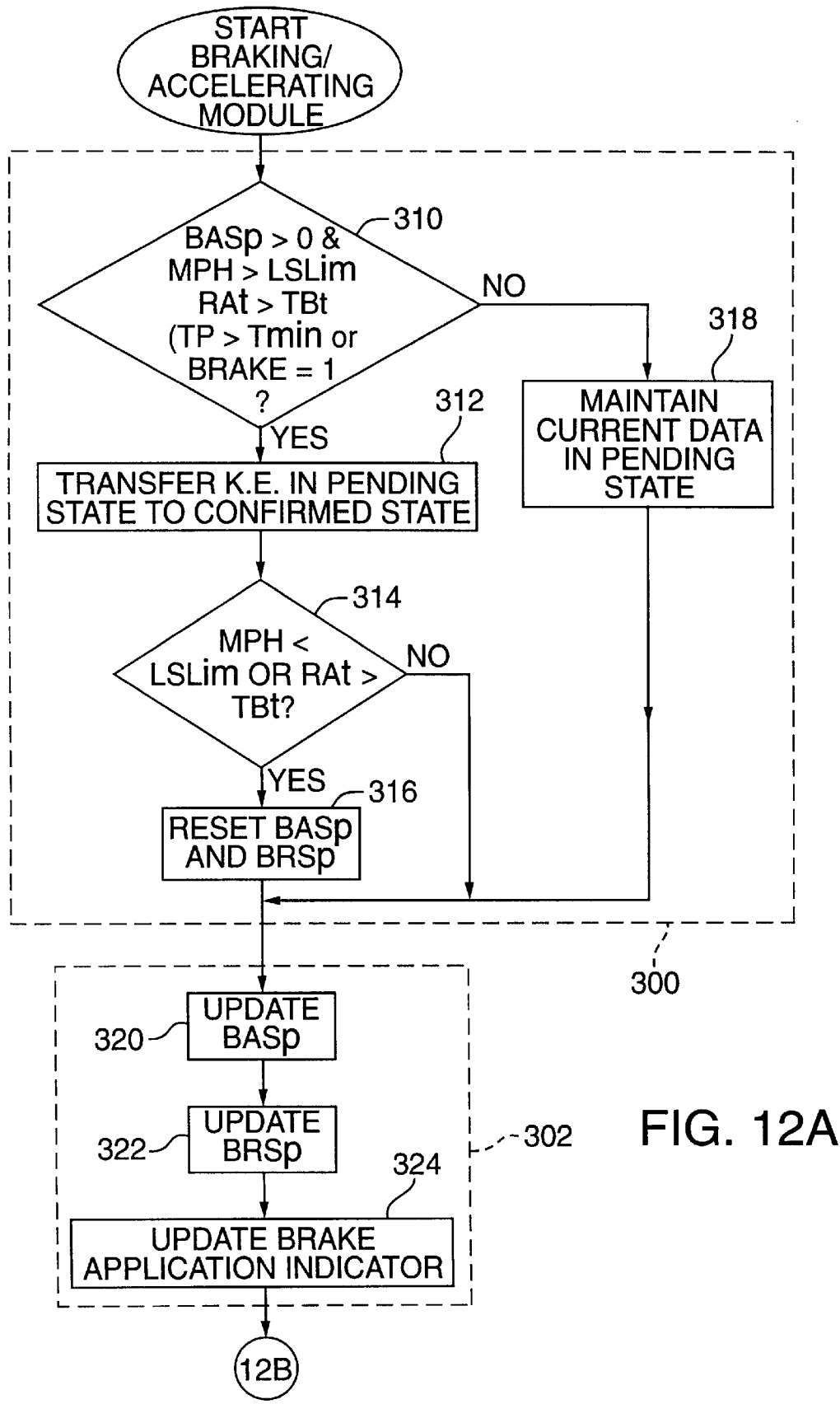
FIGS. 12A–C are a flow diagram of a braking/accelerating sub-module in the excess module for detecting inefficient fuel use due to frequent braking and accelerating conditions (i.e., fuel lost due to changes in kinetic energy of the vehicle).
Figure 12B:
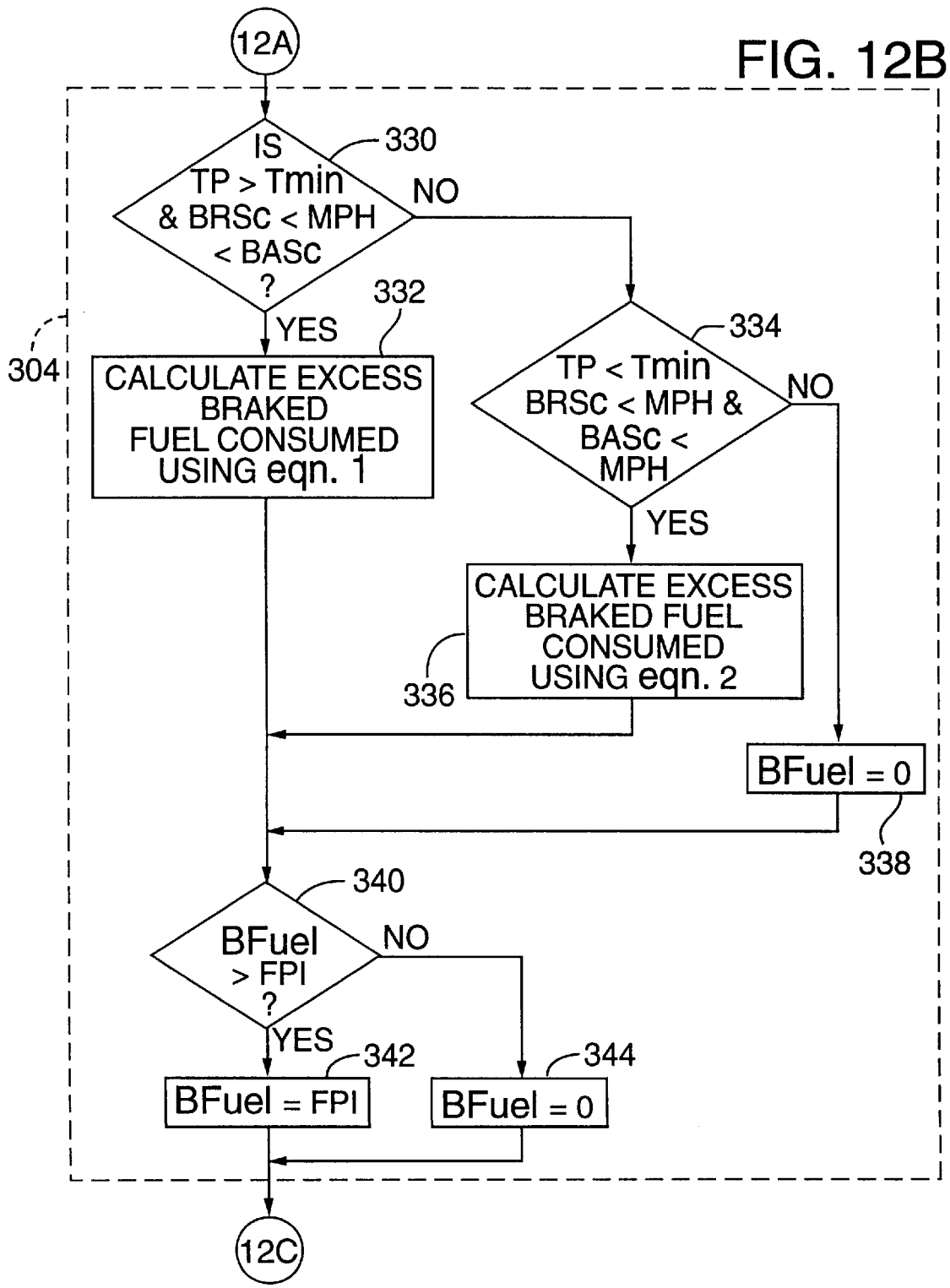
Figure 12C:
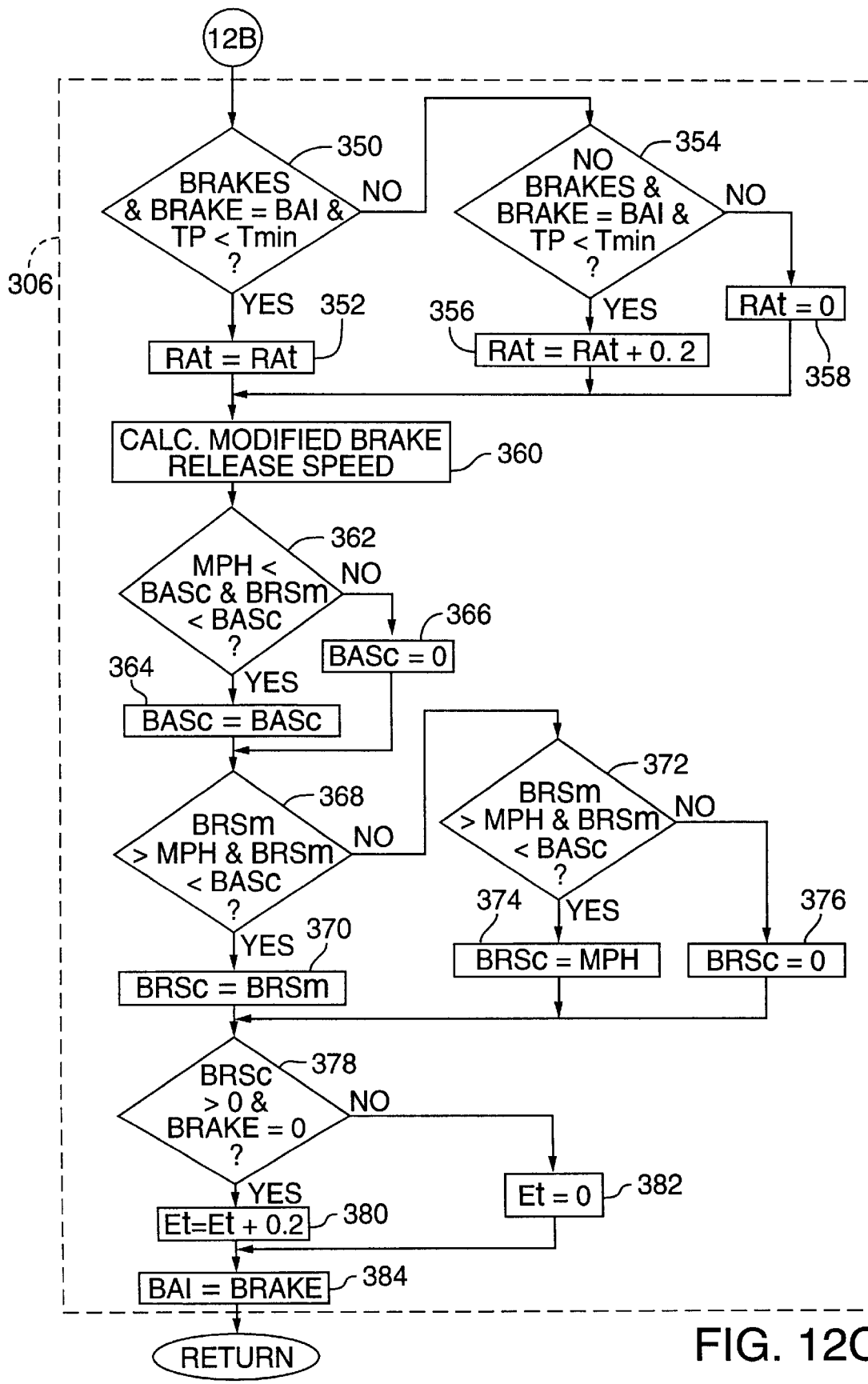

FIG. 12 is a flow diagram illustrating an implementation of the Braking/Acceleration module. This module is divided into four sections—Confirm 300, Braking 302, BFuel 304 and Updates 306:

Confirm—This section of the module determines if pending braked changes in the vehicle's speed should be transferred to the confirmed state, zeroed or retained in the pending state. The first step 310 is to determine if pending braked changes in vehicle speed (if any) should be transferred to the confirmed state.

If the following conditions are true:

1) pending brake applied speed—an input—is greater than zero (BASp-→0),
2) the current vehicle speed is greater than the low speed limit (MPH-→LSLim),
3) the release/application time is greater than the throttle/brake time (Rat>Tbt),
4) the throttle position is greater than Tmin or the brakes are applied (TP>Tmin or Brake=1), and
5) the brake application indicator equals zero (BAI=0), then:

The confirm section transfers the kinetic energy in the pending state to the confirmed state as follows (312), $$BASc = sqrt(BASc^2 BRSc^2 + BASp^2)$$

and updates BRSc to BRSp; i.e., $$BRSc = BRSp.$$

If the current vehicle speed (MPH) is less than the low speed limit (LSLim) or the release/application time (RAt) is greater than the throttle/brake time (TBt) (314), then it sets the pending brake applied and released speeds (BASp and BRSp) to zero (316).

Holding the current information in the pending state occurs without any action if the conditions of these cases are not met (318).

Braking—This section of the braking/accelerating module updates the pending brake application and release speeds (BASp and BRSp) and the brake application indicator (BAI) (all of its inputs). The first step (320) is to update the pending brake application speed (BASp).

If the following conditions are satisfied:

1) the brakes are applied,
2) the previous brake application speed is less than the current vehicle speed (Brake=1 and BASp<MPH),
3) the low speed limit is less than the current vehicle speed (LSLim<MPH), and
4) the release/application time is less than the throttle/brake time (Rat<TBt), then the braking section 302 sets the pending brake application speed (BASp) to the current vehicle speed (MPH); i.e., $$BASp = MPH.$$

If the brakes are applied and the previous brake application speed is less than the current vehicle speed (Brake=1 and BASp<MPH) but the current vehicle speed is less than the low speed limit or the throttle/brake time is less than the release/application time (MPH<LSLim or TBt<RAt), then it sets the pending brake application speed (BASp) to zero.

If neither of these conditions are true, then it maintains the pending brake application speed (BASp); i.e., $$BASp = BASp.$$

The next step is to update the pending brake release speed (BRSp) (322).

If the brake application speed is greater than zero (BASp>0) and the brakes are applied (Brake=1), then the braking section sets the pending brake release speed (BASp) to the current vehicle speed (MPH); i.e., $$BRSp = MPH.$$

If the brake application speed is greater than zero (BASp>0) but the brakes are not applied (Brake=0), then it sets the pending brake release speed (BRSp) to the previous pending vehicle speed (BRSp); i.e., $$BRSp = BRSp.$$

If neither of these conditions are true, then it sets the pending brake release speed (BRSp) to zero.

The last step 324 is to update the brake application indicator (BAI). If the brake application indicator is high (BAI=1) or the vehicle is being braked (Brake=1), then the braking section 302 sets the brake application indicator high; i.e., $$BAI = 1.$$

Otherwise, it sets the brake application indicator low; i.e., $$BAI = 0.$$

BFuel—This section of the module calculates the excess fuel (if any) consumed during the current iteration due to unnecessary braking/accelerating.

The first step 330 is to determine if the throttle position is greater than the minimum throttle position and the vehicle speed is between the confirmed brake release speed and the confirmed brake application speed (BRSc<MPH<BASc). If it is, then the BFuel Section 304 calculates the increment of excess braked fuel (BFuel) consumed using the following equation (equation 1, 332), $$BFuel=GVW*(MPH\char`\^2-BRSc\char`\^2)*SFCa/DTeff/274292480.$$

If the throttle position is greater than the minimum throttle position (PT>Tmin) and the confirmed brake release speed is less than the current vehicle speed, but the confirmed brake application speed is less than the current vehicle speed (BRSc<MPH and BASc<MPH) (334), then it calculates the increment of excess braked fuel (BFuel) consumed using the following equation (equation 2, 336), $$BFuel=GVW*(BASc\char`\^2-BRSc\char`\^2)*SFCa/DTeff/274292480.$$

Otherwise, it sets the increment of excess braked fuel equal to zero (338).

If the braked fuel exceeds the actual fuel (BFuel>FPI) (340), then the BFuel section sets the value of the braked fuel (BFuel) equal to the fuel per iteration (FPI); i.e., $$BFuel=FPI\ (342).$$

Otherwise, it sets $$BFuel=BFuel\ (344).$$

Updates—This, the last section of the Braking/Acceleration module, updates the release/application (RAt) and elapsed time (Et) timers, the confirmed brake release (BRSc) and application (BASc) speeds and the brake application indicator (BAI) as follows.

If the brakes are applied and the brake application indicator high (Brake=BAI) and the throttle position (TP) is less than Tmin as shown in decision block 350, then the updates section 306 maintains the release/application timer at its present value (352); i.e., $$RAt=RAt.$$

If the brakes are not applied and the brake application indicator is low (Brake=BAI) and the throttle position (TP) is less than Tmin (354), then it increases the release/application timer (356); i.e., $$RAt=RAt+0.2.$$

Otherwise, it sets the release/application timer equal to zero (358); i.e., $$RAt=0.$$

Next, it calculates the modified brake release speed (BRSm) (360) using the following equation.

$$BRSm=BRSc*exp(0.0002*Et).$$

If the current vehicle speed is less than the confirmed brake application speed (MPH<BASc) and the modified brake release speed is less than the confirmed brake application speed (BRSm<BASc) (362), then the updates section maintains the current confirmed brake release speed (364); i.e., $$BASc=BASc.$$

Otherwise, it sets the confirmed brake application speed to zero.

If the modified brake release speed is greater than the current vehicle speed (BRSm>MPH) and the modified brake release speed is less than the confirmed brake application speed (BRSm<BASc) (368), then it sets the confirmed brake release speed equal to the modified brake release speed (370);

$$BRSc=BRSm$$

If the modified brake release speed is not greater than the current vehicle speed (BRSm>MPH) but the modified brake release speed is less than the confirmed brake application speed (BRSm<BASc) (372), then the updates section 306 sets the confirmed brake release speed equal to the current vehicle speed; i.e., $$BRSc=MPH.$$

Otherwise, it sets the confirmed brake release speed to zero (376).

If the confirmed brake release speed is greater than zero (BRSc>0) and the brakes are not applied (Brake=0) (378), then it increments the elapsed timer (380); i.e., $$Et=Et+0.2$$

Otherwise, it sets the elapsed timer to zero (382).

The last step in this section is to update the brake application indicator to the state of the brake (384); i.e., $$BAI=Brake.$$

The Throttle Sub-Module

The throttle sub-module calculates the increase in fuel consumed (if any) when the engine is accelerated rapidly. During rapid engine acceleration, the engine's specific fuel consumption exceeds the average or nominal value which results in increased fuel consumption. The throttle module detects when rapid acceleration causes excess fuel consumption, except in special cases where rapid throttle movement is justified such as during shifting. To accommodate the need for rapid throttle movement when down shifting, the throttle module does not evaluate inefficient fuel consumption whenever the ratio of the vehicle speed divided by the engine speed is changing (clutch disengaged or transmission in neutral).

Figure 13:
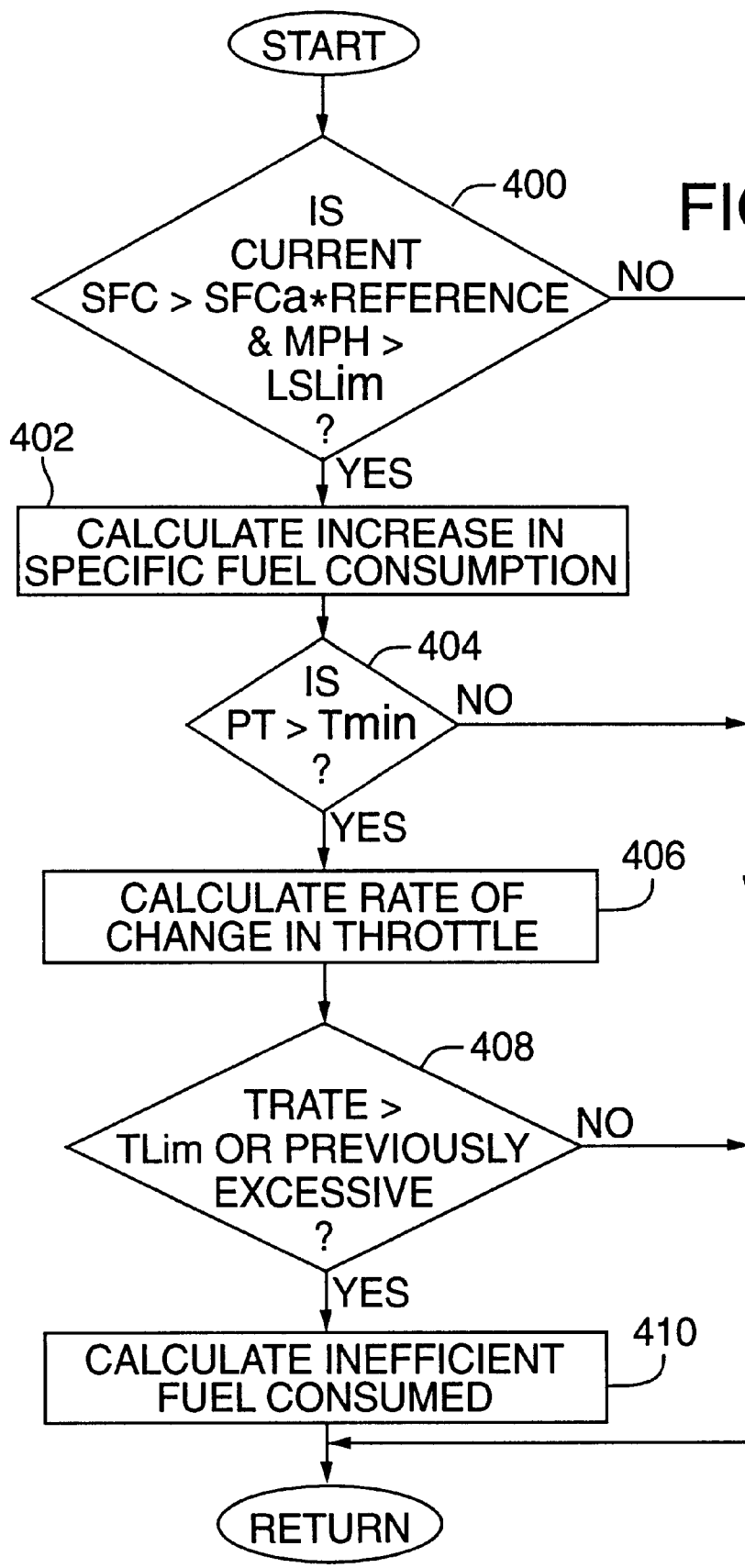
FIG. 13 is a flow diagram of a throttle sub-module in the excess module for detecting inefficient fuel use due to rapid throttle movement.

FIG. 13 is a flow diagram illustrating an implementation of the throttle module. The first step in this module is to determine: 1) if the value of the current specific fuel consumption is greater than the average specific fuel consumption multiplied by the value specified by the input Over (SFC>SFCa*Over), and 2) if the vehicle speed is greater than the low speed limit (MPH>LSLim) (400).

If both of these conditions are true, then the throttle module calculates the increase in specific fuel consumption (DSFC) (402); i.e., $$DSFC=SFC-SFCa.$$

Otherwise, it sets $$DSFC=0.$$

Next, it evaluates the rate of change of the throttle. If the throttle position is greater than the minimum throttle position (PT>Tmin) (404), then the throttle module calculates the rate of change of the throttle position (TRate) (406) as the difference between the current throttle position (TP) and the previous averaged throttle position (TPp); i.e., TRate=PT−PTp.

Otherwise, it sets

TRate=0.

The last step is to calculate the inefficient fuel used (if any) due to rapid throttle movement (MFuel). If the throttle rate is greater than the throttle rate limit (TRate>TLim) or this condition was the dominate cause of inefficient fuel use during the previous iteration (DCase=4) and the ratio status indicator is high (RSI=1) (408), then the throttle module calculates the inefficient fuel consumed 410. In this implementation, the throttle module uses the following equation to compute the excess fuel consumed due to rapid throttle movement, MFuel=DSFC*HP/18000*RSI.

Otherwise, it sets

MFuel=0.

The description above represents only one possible implementation of the throttle module. In a second implementation, the value of the throttle position is smoothed when it is updated using filtering. Specifically in the second implementation, the previous value of PTp is smoothed using a filtering expression of the form:

PTp=k(PID 92)+(1−k)PTp or PTp=k(PT)+(1−k)PTp.

The first expression with a k of 0.2 is used when the vehicle is operating in cruise control, and the second expression with a k of 0.4 is used when cruise is not operating to smooth throttle movement caused by operating over bumps or rough roadways.

The Total Sub-Module

The total sub-module accumulates (from the start of the trip) the actual fuel consumed, the total fuel used inefficiently from all sources, and the inefficient fuel for each of the sources.

FIG. 14 is a flow diagram illustrating an implementation of the total module. The actual trip fuel (TFuel) is accumulated each iteration as follows, TFuel=TFuel+FPI (420).

The total excess or inefficient fuel used during the current interval is the sum of the excess fuels from each of the sources (422), i.e., FLoss=AFuel+RFuel+BFuel+MFuel.

If FLoss is larger than FPI, then it sets

FLoss=FPI.

Otherwise, it sets

FLoss=FLoss.

The total module then updates the excess fuel (424) using

Xces=Xces+FLoss.

The accumulated inefficient fuel consumed by each of the sources is updated (426) as follows:

AFuel=AFuelp+AFuel,

BFuel=BFuelp+BFuel,

IFuel=IFuelp+IFuel,

MFuel=MFuelp+Mfuel, and

RFuel=RFuelp+RFuel, where the lower case p designates the previous value (from memory).

The Display Sub-module

The display sub-module selects which (if any) of the fuel inefficient driving types is currently producing the largest increment of excess fuel. FIG. 15 illustrates a flow diagram illustrating an overview of the steps performed the display module.

In some special cases, this module is responsible for disabling the message prompt. For example, to avoid displaying a "SHIFT UP—SAVE FUEL" message, if the vehicle speed is greater than the current vehicle speed (MPH>SLim), then it sets RFuel=0 (442).

Otherwise, it sets

RFuel=RFuel.

The next step 444 is to determine which of the driving types is producing the largest increment of excess fuel (if any) and assign the variable DCase the numeric value shown in Table 5 (446).

TABLE 6

| Driving Type | Excess Fuel | DCase |
| --- | --- | --- |
| No Excess Fuel | — | 0 |
| Speeding | AFuel | 1 |
| High Engine RPM | RFuel | 2 |
| Excessive Idling | IFuel | 3 |
| Braking/Accelerating | BFuel | 4 |
| Rapid Throttle Movement | MFuel | 5 |

Excessive idling occurs when the current engine idle time is longer than the idle limit, the vehicle speed is zero (<2 mph) and the PTO is not operating.

The display sub-module is also responsible for updating the mpg for the trip (TMPG). If the trip fuel (TFuel) is less than 0.05, then it sets TMPG=0. Otherwise, it sets:

TMPG=TODO/TFuel

Next, the mpg loss (if any) is calculated, smoothed and capped. If the current vehicle speed is greater than the low speed limit (MPH>LSLim) and the fuel consumed during the current iteration is greater than the fuel lost due to monitored inefficient driving conditions (FPI−FLoss>0), then current mpg loss is calculated as follows:

Lmpg=TMPG*FLoss/(FPI−FLoss)

If Lmpg is greater than a constant value (e.g., 5.9 in this case), then it is reset (capped) with Lmpg=5.9.

As calculated above, the value Lmpg should preferably be smoothed before it can be displayed to drivers. This requires carefully selecting values for the filter coefficient (K) for the geometric filter used to average or smooth Lmpg. To provide the smooth operation plus rapid action-reaction drivers expect, different values of K are needed for various operating conditions. If the value of Lmpg is greater than its value from the previous iteration (Lmpgp), then the geometric filter coefficient K is selected as follows: If Lmpgp is less than 0.05 set K=1, otherwise, set K=0.3. If Lmpg is greater than Lmpgp then set K=0.05.

Once the value of the filter coefficient K is selected, Lmpg is smoothed using the following:

$$Lmpg=K*Lmpg+(1-K)*Lmpgp$$

If the value of Lmpg is greater than 4, then scale Lmpg as follows:

$$Lmpg=Lmpg/1.5$$

If the value of Lmpg is still greater than 4.9, then set Lmpg to 4.9.

The display sub-module "bridges" short discontinuities or dropouts in the selection of DCase. This avoid messages flashing on and off in the driver message center.

When FLoss is greater than zero and Xcesa is greater than FLoss, then the display sub-module sets:

$$DCase=PCase$$

Otherwise, it retains the value of DCase selected above. Similarly, if Lmpg is greater than 0.12 or DCase equals PCase, then it retains the current value of DCase. Otherwise, it sets DCase equal to zero.

The Average Sub-Module

The average sub-module updates the values of several variables in preparation for the next iteration. FIG. 16 illustrates an implementation of the average sub-module.

First, the values for the excess (Xcesa) and trip (TFuela) fuel are updated as shown in Steps 460 and 462. This implementation uses an asymmetrical geometric filter. The effective time constants of this filter are specified by the inputs Tp and Tm (Tau+ and Tau−). If the fuel use efficiency level is increasing (FLoss>0), the geometric filter coefficient is $$C=\exp(-0.2/Tm).$$

Otherwise, it sets $$C=\exp(0.2/Tp).$$

Both Xcesa and TFuela are updated recursively as follows:

$$Xcesa=C*Xcesa+FLoss \text{ and}$$

$$TFuela=C*TFuela+FPI.-$$

An alternative way to compute Xcesa is to compute a geometric average of the previous value of Xcesa and FLoss computed for the current iteration. Similarly, an alternative way to compute TFuela is to compute a geometric average of the previous value of TFuela and FPI for the current iteration. For example, Xcesa and TFuela can be updated as follows:

$$Xcesa=(1-C)*Xcesa+C*FLoss \text{ and}$$

$$TFuela=(1-C)*TFuela+C*FPI,$$

where C is a filter coefficient.

To minimize the possibility of unintentional throttle movement causing the "THROTTLE SLOWER" messages to be displayed, the previous throttle position (PTp) is calculated as a geometric average of the current and previous throttle positions (464); i.e., $$PTp=0.6PTp+0.4*PT.$$

The last step 466 in this sub-module is to update the average specific fuel consumption (SFCa) using a long duration geometric average of the current and previous specific fuel consumption. If the engine horsepower is greater than 10 percent (HP>40), then SFCa is updated recursively using the following equation:

$$SFCa=0.995*SFCa+0.005SFC.$$

Otherwise, it maintains the same value for the specific fuel consumption, $$SFCa=SFCa.$$

To accommodate engines of various horsepower ratings, the 10 percent criteria described above should be initialized based on information from the engine ECU at power on.

In a second implementation, the average module is also responsible for computing the instantaneous fuel economy (IFE) and a short term average fuel economy. The IFE is calculated as:

$$IFE=MPH/FRate.$$

The short term average fuel economy is a weighted average of IFE and the previous value of short term average fuel economy:

$$STAFEnew=C(IFE)+(1-C)STAFEprevious,$$

where C is a filter coefficient. In this implementation, C is selected dynamically based on a comparison between IFE and the previous value of STAFE. Specifically, if IFE is less than STAFE then C is set to 0.9 so that more weight is applied to IFE. Otherwise, C is set to the value of C1, an input to the ICU.

The average module can also compute the current fuel use efficiency level as follows:

$$eff=(1-Xcesa)/TFuela*100.$$

The average module uses filtering to smooth the value for fuel efficiency level. In this implementation, if the fuel efficiency level is greater than the value for the previous iteration of the Excess module, then the value is smoothed as follows:

$$eff=0.1*eff+0.9*effp,$$

where effp is the previous value.

In this implementation, the average module calculates the efficiency level so that there is a rapid change when its value is decreasing. To accomplish this, it uses no filtering if the fuel efficiency is declining. The average module sets a floor of 30 for the value of eff so that the display driver uses at least a fuel efficiency value of 30 when computing display quantities.

The Display Driver Module

The display driver module (126, FIG. 6) acts as the interface between the ICU and the display hardware connected to the ICU. In this implementation, the display hardware comprises a vacuum fluorescent display panel. However, the type of display device is not particularly critical to the invention. In fact, the system can indicate the presence of an inefficient driving action aurally instead of visually. For example, the system could sound an alarm when inefficient fuel use is detected due to excessive speed, high RPM, excessive idling, frequent braking and accelerating, and rapid throttle movement.

The display driver 126 utilizes information generated in the input 120, VPE 122, and excess 124 modules and inputs from the driver keypad to select which of several pre-programmed messages to display in the driver message center on the display panel. Unless otherwise stated, information from the prior iteration is read from memory as an input at power on, updated and stored in memory during each iteration and when the system is powered down. This module executes when the fuel rate (PID 183) information is updated—every 200 ms. The updated information is recorded in memory for use by the other modules.

The current implementation of the display driver consists of two parts. Part 1 combines information from the previous modules and the previous iteration with current inputs from the driver keypad to determine if the information displayed in the driver message center requires updating. Part 1 directs Part 2 to; a) maintain the current message in the driver message center; b) update the driver selected preprogrammed normal driving message or c) if enabled, display one of the preprogrammed driver prompting messages.

Part 1 determines which message to display and when to update the display. In this implementation, the messages are grouped in three sets: 1) general fuel efficiency messages; 2) trip summary related messages; and 3) prompting messages. Each of these message sets is associated with a message set parameter. The driver can control the value of the message set parameter by operating push buttons on the key pad of the ICU. The first message set also includes a number of fuel efficiency messages, each associated with a message subset parameter. The driver can select one of the fuel efficiency messages to display by operating a button on the key pad as well. If an inefficient driving condition is detected, however, the prompting messages take precedence over the driver selected messages or the normal driving messages.

The first step in the display driver module is to evaluate the parameters that control the current message set and subsets. The display driver is responsible for updating the message parameters in response to inputs from the keypad. The display driver begins by evaluating whether to update the message set and subset parameters.

Next, part 1 of the display driver determines whether to enable a driver prompting message. Determining the driver prompting message (if any) is a five step process. This process is computed based on the following parameters:

1) Dcase—This is the number of the case to be shown on the display as determined in the Excess module.
2) Pcase—This is the value of the case previously shown on the display.
3) Dmin—This is the minimum time in milliseconds that a message is displayed. The value of this parameter can be entered as an input to the ICU.
4) DTime—This is the number of milliseconds that the current prompting message has been displayed. This parameter is updated and stored in memory for every iteration of the display driver module.

Step one of the process is to take the absolute value of the parameter PCase from the previous iteration. In the second step, if PCase is greater than zero and the display time (DTime) is less than the minimum display time (Dmin) and DCase equals zero, then the display driver sets PCase equal to its previous value. This ensures that a prompting message will be displayed for at least the minimum display time. If the conditions of step two are not met, then the display driver sets PCase equal to DCase.

In the third step, if PCase equals 2 (the previous case represents excessive idling) and DCase equals zero, then the display driver sets PCase equal to zero. This step ensures that the prompting message for excessive idling is turned off when the excessive idling condition is no longer present.

Otherwise, if DCase equals 3, meaning that the speeding condition was detected, then the display driver sets PCase equal to 3. If DCase does not equal 3, then it sets PCase equal to its current value.

In the fourth step, if PCase equals 1, meaning that the breaking/accelerating condition was detected in the last iteration, and DTime is greater than 30000 (30 seconds), then the display driver sets PCase equal to minus one. Otherwise, it sets PCase equal to its current value.

In the fifth and last step, if PCase equals minus one and DTime is greater than 300000 and less than 315000, then the display driver sets PCase equal to one. Otherwise, it sets PCase equal to its current value.

Next, the display driver determines the message set to be displayed in the driver information center based on the message set parameter. The display driver then determines whether to increment the elapsed time parameter, Dtime. Note that the elapsed time parameter is used to evaluate the case where the breaking/accelerating condition is present for more than 30 seconds. If the vehicle speed is increasing, then the elapsed time parameter is not incremented. However, if the vehicle speed is not increasing and a prompting conditions was detected in the last iteration, then the elapsed time parameter is incremented by a constant representing the elapsed time since the last iteration (e.g., 200 ms).

Part 2 of the display driver retrieves from memory and inserts current numeric values (if needed) into the preprogrammed message selected for display. Next, if fuel inefficient driving is occurring and driver prompting messages are enabled, the normal driving message is replaced by a driver prompting message.

Using the keypad, specific messages within the general fuel efficiency and message sets can be selected for display. If enabled, the driver prompting messages appear whenever fuel inefficient driving is detected.

A number of examples of the general fuel efficiency messages are described below.

Examples of General Fuel Efficiency Messages

MPG Bargraph with FUEL SCORE

The following table shows the format of this message on the 2 line display:

| | |
|---|---|
| Bargraph | xx.x MPG |
| FUEL SCORE | xxx |

The bargraph is implemented using the characters on the vacuum flourescent display device. The maximum length of the bar displayed is 13 characters. The actual length of the bar displayed is 13/19.9*STAFE. The MPG value displayed is the value of STAFE. If the parameter TFuel is greater than zero, the FUEL SCORE value displayed is determined as follows:

$$\text{FUEL SCORE} = (1 - 3 * X\text{ces}/T\text{Fuel}) * 100$$

If TFuel is not greater than zero, then the display driver sets FUEL SCORE equal to 100. Alternatively if this value of FUEL SCORE is less than 30, then FUEL SCORE is set equal to 30.

Efficiency Bargraph with Trip Efficiency

The following table shows the format of this message on the 2 line display:

| Bargraph | xxx % |
|---|---|
| Trip % | xx.x % |

The maximum length of the bar displayed is 16 characters. The actual length of the bar displayed is 0.16*eff. The value displayed to the right of the bar is the value of eff. If TFuel is greater than 0.1, the TRIP % is computed as follows:

TRIP %=(1−3*Xces/TFuel)*100

If TFuel is not greater than 0.1, then the display driver sets TRIP % equal 100. Alternatively, if this value of TRIP % is less than 50, then it recalculates TRIP % as follows:

TRIP %=(1−2*Xces/TFuel)*100

Fuel Efficiency with Trip Efficiency

The following table shows the format of this message on the 2 line display:

| Fuel Efficiency | xxx % |
|---|---|
| Trip % | xx.x % |

The FUEL EFFICIENCY value displayed is the value of eff. If TFuel is greater than 0.1 the TRIP % displayed is determined as follows:

TRIP %=(1−3*Xces/TFuel)*100

If TFuel is not greater than 0.1, then the display driver sets TRIP % equal to 100. Alternatively, if this value of TRIP % is less than 50, then it recalculates TRIP % as follows:

TRIP %=(1−2*Xces/TFuel)*100

Prompting Messages

In this implementation there are five specific prompting messages as shown in Table 3 above. These messages are identified by PCase values of 1 through 5.

Speeding

The MPH displayed in the first line of this message is the reference speed (Sref). The Gain value displayed is Lmpg, calculated by the display sub-module of the Excess software module.

High Engine RPM

The Gain value displayed is Lmpg, calculated by the display sub-module of the Excess software module.

Excessive Idling

The SAVE value displayed is the current fuel rate of the engine expressed in GAL,/Hr; i.e., PID 183 divided by 64.

Braking/Accelerating

The Gain value displayed is Lmpg, calculated by the display sub-module of the Excess software module.

Rapid Throttle Movement

The MPG displayed in the first line of this message is the reference speed (Sref). The Gain value displayed is Lmpg, calculated by the display sub-module of the Excess software module.

Conclusion

While the invention is described with reference to a specific implementation, it is important to emphasize that the invention is not limited to the specific design details of this implementation. The sensors used to monitor engine parameters need not be connected to the engine ECU, but instead can be connected to the control unit that evaluates the data to detect excess fuel use, e.g., the ICU. In addition, the format of the data does not have to be in the form of serial data from a serial data link as in a system built for a J1708 data link. Instead, the data can be polled and buffered in memory of the control unit from discrete devices.

The software implementation can vary as well. The system above is organized into four modules, but the same or similar logic can be implemented using a different software architecture and using a combination of software and hardware logic. The precise logic and the order in which steps are performed to detect excess fuel consumption and to compute excess fuel can vary.

The measures of excess fuel consumed and fuel efficiency can also be modified without departing from the scope of the invention. For example, excess fuel consumed can be conveyed as a volume of excess fuel or as an incremental value of fuel economy that reflects the decline in fuel economy due to an inefficient driving action. Conversely, the excess fuel consumed can be represented by a fuel economy value indicating the increase in fuel economy that could be obtained if a suggested driver action is taken.

Having described and illustrated the principles of my invention with reference to a specific embodiment and possible alternative embodiments, it should be apparent that the invention can be modified in arrangement and detail without departing from its principles. Accordingly, we claim all modifications as may come within the scope and spirit of the following claims.

We claim:

1. A method for assisting a driver of a vehicle to improve fuel economy while operating the vehicle on a roadway, the method comprising:

collecting vehicle performance data during operation of the vehicle;

during operation of the vehicle, monitoring for two or more conditions in which the vehicle is consuming excess fuel;

during operation of the vehicle, detecting from the vehicle performance data whether at least one of the conditions exist in which the vehicle is consuming excess fuel; and during operation of the vehicle, indicating to the driver that excess fuel is being consumed due to the detected condition and a cause of the detected condition.

2. The method of claim 1 wherein the condition comprises one or more of the following conditions: increased aerodynamic drag due to excessive vehicle speed, operating at high RPM, excessive idling, changes in kinetic energy due to braking or accelerating, or rapid throttle movement.

3. The method of claim 1 further including:

displaying a message to the driver indicating a driving action that will improve fuel economy.

4. The method of claim 1 wherein the condition comprises excessive speed.

5. The method of claim 4 wherein the step of detecting the excessive speed condition includes:

comparing current vehicle speed to a reference speed.

6. The method of claim 5 wherein the reference speed is dynamically updated based on recent speed readings of the vehicle.

7. The method of claim 1 further including:

computing excess fuel consumed due to increased aerodynamic drag.

8. The method of claim 7 further including:
dynamically estimating the aerodynamic drag factor of the vehicle.

9. The method of claim 7 further including:
indicating the excess fuel consumed due to increased aerodynamic drag to the driver.

10. The method of claim 1 wherein the condition comprises high engine RPM.

11. The method of claim 10 wherein the high engine RPM condition is detected by comparing current RPM of the vehicle with a reference RPM that is dependent on a dynamically determined horsepower of the vehicle.

12. The method of claim 10 wherein the step of detecting the high engine RPM condition includes:
determining whether the driver is shifting the vehicle during a predetermined monitoring period;
when it is determined that the driver is shifting during the predetermined monitoring period, determining that the high engine RPM condition is not satisfied to avoid indicating that excessive fuel is being consumed due to high engine RPM.

13. The method of claim 10 further including:
computing excess fuel consumed due to high engine RPM.

14. The method of claim 13 wherein the excess fuel consumed is proportional to an amount by which current engine RPM exceeds a calculated engine speed limit.

15. The method of claim 13 further including:
indicating the excess fuel consumed due to high engine RPM to the driver during operation of the vehicle.

16. The method of claim 1 wherein the condition comprises a braked speed change that results in a loss of kinetic energy of the vehicle.

17. The method of claim 16 further including:
determining elapsed time between applying brake and throttle to evaluate whether excess fuel is being consumed.

18. The method of claim 16 further including:
determining rate of increase of vehicle speed after a brake event to evaluate whether excess fuel is being consumed.

19. The method of claim 16 further including:
computing excess fuel consumed due to the braked speed change during operation of the vehicle.

20. The method of claim 19 wherein the excess fuel consumed is computed as a function of change in kinetic energy due to braking.

21. The method of claim 19 further including dynamically estimating gross vehicle weight and computing the excess fuel consumed based, at least in part, on the estimated gross vehicle weight.

22. The method of claim 19 further including:
indicating the excess fuel consumed due to the braked speed change to the driver during operation of the vehicle.

23. The method of claim 1 wherein the condition comprises excessive idling.

24. The method of claim 23 further including:
determining whether idling time exceeds a reference time.

25. The method of claim 23 further including:
computing excess fuel consumed due to excessive idling during operation of the vehicle.

26. The method of claim 25 further including:
indicating the excess fuel consumed due to excess idling to the driver.

27. The method of claim 1 wherein the condition comprises rapid throttle movement.

28. The method of claim 27 further including:
determining the rate of change of throttle position.

29. The method of claim 27 further including:
comparing specific fuel consumption with an average specific fuel consumption to evaluate whether rapid throttle movement resulted in consumption of excess fuel.

30. The method of claim 27 further including:
computing excess fuel consumed due to rapid throttle movement during operation of the vehicle.

31. The method of claim 30 further including:
indicating excess fuel consumed due to rapid throttle movement to the driver during operation of the vehicle.

32. The method of claim 1 further including dynamically estimating vehicle drag, and using the estimated vehicle drag to detect when changes in vehicle speed result in excess fuel consumption.

33. The method of claim 32 further including dynamically estimating grade of the roadway.

34. A computer readable medium having instructions for performing the steps of claim 1.

35. A fuel efficiency indicator for a vehicle, comprising:
an output device; and
an instrumentation control for receiving vehicle performance parameters monitored during operation of the vehicle, for detecting from the vehicle performance data whether a condition exists in which the vehicle is consuming excess fuel during operation of the vehicle, and for controlling the output device to indicate to the driver that excess fuel is being consumed, including indicating during operation of the vehicle a quantity of fuel consumed due to the detected condition.

36. The fuel efficiency indicator of claim 35 wherein the output device comprises a display device, and the instrumentation control unit is operable to produce a display of a measure of excess fuel consumed due to the detected condition.

37. The fuel efficiency indicator of claim 35 wherein the output device comprises a display device, and the instrumentation control unit is operable to produce a display of a message indicating the detected condition.

38. The fuel efficiency indicator of claim 37 wherein the message indicates a driver action to reduce excess fuel consumption resulting from the detected condition.

39. The fuel efficiency indicator of claim 37 wherein the condition comprises increased aerodynamic drag due to excessive vehicle speed.

40. The fuel efficiency indicator of claim 37 wherein the condition comprises operating at high RPM.

41. The fuel efficiency indicator of claim 37 wherein the condition comprises excessive idling.

42. The fuel efficiency indicator of claim 37 wherein the condition comprises changes in kinetic energy due to braking or accelerating.

43. The fuel efficiency indicator of claim 37 wherein the condition comprises rapid throttle movement.

44. A fuel efficiency indicator for a vehicle, comprising:
a display device; and
an instrumentation control unit in communication with the display device, the instrumentation control unit operable to receive vehicle performance parameters, operable to detect from the vehicle performance data whether a condition exists in which the vehicle is consuming excess fuel, and operable to control the output device to indicate to the driver that excess fuel is being consumed in response to detecting the condition, to indicate a message indicating a driver action to reduce excess fuel consumption due to the detected condition, and to display a measure of excess fuel consumed due to the detected action.

45. A method for assisting a driver of a vehicle to improve fuel economy while operating the vehicle on a roadway, the method comprising:

collecting vehicle performance data during operation of the vehicle;

during operation of the vehicle, monitoring for two or more conditions in which the vehicle is consuming excess fuel;

during operation of the vehicle, detecting from the vehicle performance data whether at least one of the conditions exist in which the vehicle is consuming excess fuel;

measuring fuel consumption attributable to a detected condition in which the vehicle is consuming excess fuel; and during operation of the vehicle, indicating to the driver that excess fuel is being consumed due to the detected condition, within a predefined period of detecting the condition and a cause of the detected condition.

46. The method of claim 45 wherein the predefined period is less than a second.

47. The method of claim 45 wherein the predefined period is less than 300 milliseconds.

48. The method of claim 45 wherein the indicating step includes displaying a prompting message indicating the type of condition to the driver.

49. The method of claim 48 further including: displaying an indicator of a quantity of excess fuel or fuel efficiency loss due to the detected condition.

50. The method of claim 45 wherein the condition includes one or more of the following:

increased aerodynamic drag due to excessive vehicle speed, operating at high RPM, excessive idling, changes in kinetic energy due to braking or accelerating, or rapid throttle movement.

51. The method of claim 45 wherein the detecting step includes monitoring for two or more of the following conditions:

increased aerodynamic drag due to excessive vehicle speed, operating at high RPM, excessive idling, changes in kinetic energy due to braking or accelerating, or rapid throttle movement.

52. The method of claim 51 further including: determining which of the two or more conditions has caused the most inefficient fuel use; wherein the indicating step includes indicating the condition that has caused the most inefficient fuel use.

53. The method of claim 52 further including:

if one or more of the conditions is detected, repeatedly updating a display with an indicator of the condition that has caused the most inefficient fuel use.

54. The method of claim 53 including:

filtering a display parameter to smooth fluctuations in the indicator.

* * * * *

UNITED STATES PATENT AND TRADEMARK OFFICE
CERTIFICATE OF CORRECTION

PATENT NO. : 6,092,021　　　　　　　　　　　　　　　　　　　　　　　Page 1 of 1
DATED : July 18, 2000
INVENTOR(S) : Ehlbeck et al.

It is certified that error appears in the above-identified patent and that said Letters Patent is hereby corrected as shown below:

Signed and Sealed this

Sixteenth Day of October, 2001

Attest:

*Nicholas P. Godici*

NICHOLAS P. GODICI
*Attesting Officer*　　　*Acting Director of the United States Patent and Trademark Office*

UNITED STATES PATENT AND TRADEMARK OFFICE
CERTIFICATE OF CORRECTION

PATENT NO. : 6,092,021
DATED : July 18, 2000
INVENTOR(S) : Ehlbeck et al.

It is certified that error appears in the above-identified patent and that said Letters Patent is hereby corrected as shown below:

Column 10,
Line 30, "(*F*Sum-Beta*$V^{\wedge}$A2Sum)" should read -- (*F*Sum-Beta*$V^{\wedge}$2Sum) --.

Column 13,
Lines 33-54, the numbers appearing between "this sub-module are:" and "vehicle velocity and engine RPM" should not be bolded.

Column 15,
Line 44, "ESL), p1 3) the" should read -- ESL), 3) the --.

Column 17,
Line 64, "^2BRSc" should read -- ^2-BRSc --.

Column 20,
Line 8, "(370);" should read -- (370); i.e., --.

Column 27,
Line 18, "equal 100" should read -- equal to 100 --.
Line 56, "GAL,/Hr" should read -- GAL/Hr --.

Signed and Sealed this

Thirteenth Day of November, 2001

Attest:

NICHOLAS P. GODICI
Attesting Officer
Acting Director of the United States Patent and Trademark Office